US008787982B2

(12) United States Patent
Mochizuki

(10) Patent No.: US 8,787,982 B2
(45) Date of Patent: Jul. 22, 2014

(54) MOBILE COMMUNICATION TERMINAL AND INPUT CONTROL PROGRAM

(75) Inventor: Naoki Mochizuki, Daito (JP)

(73) Assignee: KYOCERA Corporation, Kyoto (JP)

( * ) Notice: Subject to any disclaimer, the term of this patent is extended or adjusted under 35 U.S.C. 154(b) by 283 days.

(21) Appl. No.: 13/500,175

(22) PCT Filed: Oct. 28, 2010

(86) PCT No.: PCT/JP2010/005831
§ 371 (c)(1),
(2), (4) Date: Apr. 4, 2012

(87) PCT Pub. No.: WO2011/043033
PCT Pub. Date: Apr. 14, 2011

(65) Prior Publication Data
US 2012/0196657 A1    Aug. 2, 2012

(30) Foreign Application Priority Data

Oct. 6, 2009  (JP) ................................ 2009-232500

(51) Int. Cl.
*H04W 88/02*    (2009.01)
(52) U.S. Cl.
USPC ......................................... 455/566; 345/173
(58) Field of Classification Search
CPC .......... H04M 1/7258; H04M 2250/22; H04M 1/72519; G06F 3/0416; G06F 3/0488
USPC ............. 455/566, 575.1, 575.4; 345/173, 174
See application file for complete search history.

(56) References Cited

U.S. PATENT DOCUMENTS

| 2006/0284855 A1* | 12/2006 | Shintome ..................... 345/173 |
| 2009/0231293 A1 | 9/2009 | Nakayama |
| 2010/0013792 A1* | 1/2010 | Fukushima ................... 345/174 |

FOREIGN PATENT DOCUMENTS

| JP | 2002-135369 A | 5/2002 |
| JP | 2002-297318 A | 10/2002 |
| JP | 2009-217687 A | 9/2009 |

OTHER PUBLICATIONS

International Search Report dated Oct. 26, 2010, issued for International Application No. PCT/JP2010/005831.

* cited by examiner

*Primary Examiner* — Phuoc H Doan
(74) *Attorney, Agent, or Firm* — Procopio, Cory, Hargreaves & Savitch LLP

(57) ABSTRACT

A mobile communication terminal executes processing in response to input from a touch pad. Upon the start of a touch on the touch pad, first partial processing, among corresponding processing that corresponds to a position of the touch, is executed, the first partial processing including updating of a display state of the display unit. If, from the start of the touch until the touch is released, it is determined that at least a predetermined number of positions are touched, or that a first time elapses after the start of the touch without the touch being released, the display state is set to a same state as before the updating. Otherwise, second partial processing, which is the remainder of the corresponding processing excluding the first partial processing, is executed when the touch is released.

8 Claims, 15 Drawing Sheets

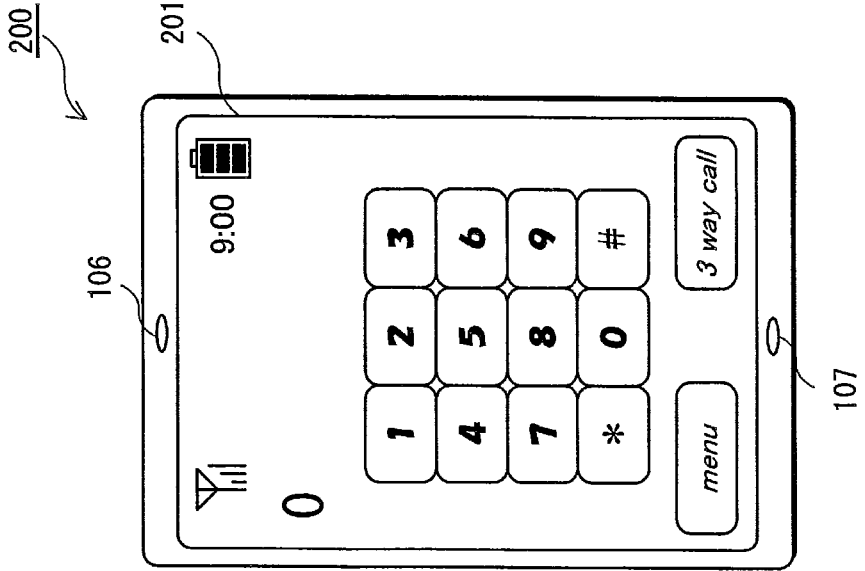
FIG. 11B Screen after touch of 0 button
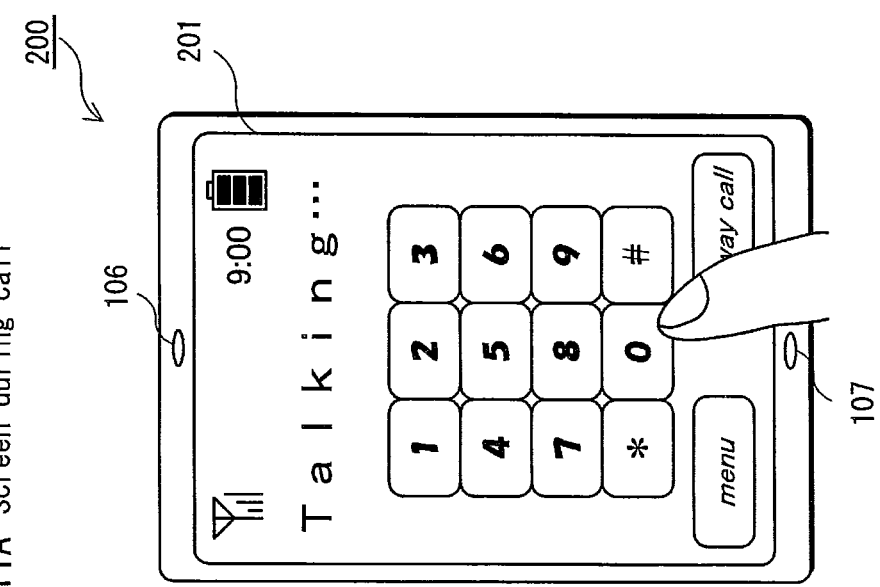
FIG. 11A Screen during call

MOBILE COMMUNICATION TERMINAL AND INPUT CONTROL PROGRAM

TECHNICAL FIELD

The present invention relates to a mobile communication terminal, such as a mobile phone, having a touch pad, and in particular to technology for controlling execution of processing based on input from the touch pad.

BACKGROUND ART

Mobile phones and the like that are operable by a touch pad suffer from the problem of incorrectly executing processing (hereinafter referred to as a "malfunction") corresponding to a location on the touch pad that, for example, is touched by a user's ear or cheek while the user is talking.

One known method of addressing this problem is to provide a sensor near the speaker of the mobile phone or the like in order to detect a touch by an ear or the like, and to invalidate input from the touch pad when the sensor detects such a touch (for example, Patent Literature 1).

Providing an additional sensor, however, is not necessarily an appropriate solution in terms of cost. It would be preferable to prevent malfunction without going to the trouble of providing a sensor.

As compared to when users perform normal operations with their fingers, when the ear or another body part touches the touch pad, the touch is typically characterized by being maintained for a longer time, or by several locations being touched. One possibility, therefore, is to detect such characteristics using a program, and upon detection, to suppress performance of processing corresponding to the touched location. Malfunction could thus be prevented without providing an additional sensor.

CITATION LIST

Patent Literature

Patent Literature 1: Japanese Patent Application Publication No. 2002-135369

SUMMARY OF INVENTION

Technical Problem

When trying to prevent malfunction with the above method, however, it is necessary to change the timing of execution of processing corresponding to a touched location so as to start when the touch is released. This is because at the point at which the touch begins, it is not yet clear whether the touch represents the user performing a normal operation, or whether the ear or another body part is touching the touch pad. In other words, it cannot be determined at the start of a touch whether the touch will continue for a longer time than a normal operation. Furthermore, when the ear or the like touches a plurality of locations on the touch pad, the plurality of locations may be touched simultaneously, or the number of touched locations may increase over an extremely short period of time.

When the timing of the start of execution of processing is changed as above, processing is not performed at the beginning of a touch. This creates a new problem in that the user perceives a reduced response from the mobile phone or the like.

The present invention has been conceived in light of the above problems, and it is an object thereof to provide a mobile communication terminal, such as a mobile phone or the like, that prevents malfunction based on input from a touch pad without giving the user the impression of a reduced response to input from the touch pad.

Solution to Problem

In order to solve the above problems, a mobile communication terminal according to the present invention executes processing in response to input from a touch pad and comprises: a display unit; a first execution unit configured to execute first partial processing, among corresponding processing that corresponds to a position of a touch, upon a start of the touch on the touch pad, the first partial processing including updating of a display state of the display unit; a first determination unit configured to determine whether, between the start of the touch on the touch pad and a release of the touch, at least a predetermined number of positions are touched, or whether a first time elapses after the start of the touch on the touch pad without the touch being released; and a second execution unit configured to execute second partial processing, which is a remainder of the corresponding processing excluding the first partial processing, when the touch on the touch pad is released without the first determination unit determining affirmatively, and to set the display state of the display unit to a same state as before the updating when the first determination unit determines affirmatively.

Advantageous Effects of Invention

With the above structure, the mobile communication terminal according to the present invention prevents malfunction based on input from the touch pad without giving the user the impression of a reduced response to input from the touch pad.

BRIEF DESCRIPTION OF DRAWING

FIGS. 11A and 11B illustrate an example of operations of a mobile phone 200 provided with a touch panel 201.

DESCRIPTION OF EMBODIMENTS

The following describes a mobile phone as an embodiment of a mobile communication terminal according to the present invention.

<<Embodiment>>
<Outline>

Figure 1:
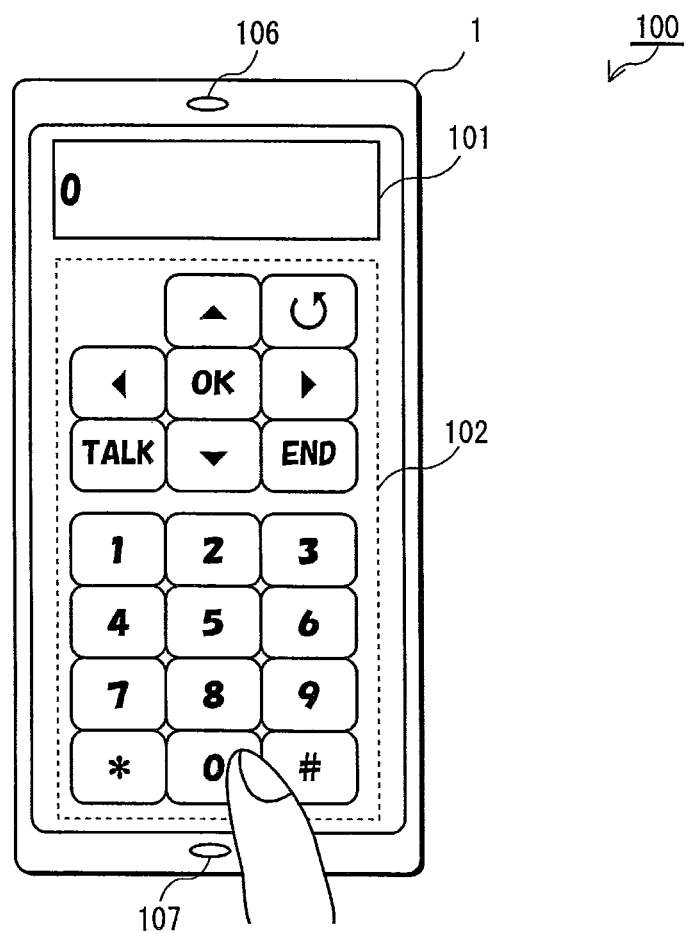
FIG. 1 is an external view of a mobile phone 100 according to an embodiment.

FIG. 1 is an external view of a mobile phone 100 according to the embodiment.

As shown in FIG. 1, the mobile phone 100 is a straight-type mobile phone. A display 101, a touch pad 102, a speaker 106, and a microphone 107 are provided inside a housing 1.

Marks indicating a variety of buttons are provided on the touch pad 102. By touching a location corresponding to one of the marks with a finger or the like, a user can cause the mobile phone 100 to perform processing allocated to the button indicated by the mark.

Note that in the context of the present invention, a touch refers to a situation in which the touch pad 102 is touched by any object, such as a user's finger, cheek, or other body part, or a touch pen or the like, that can change the capacitance of the touch pad 102. A touch also includes a non-contact situation in which any object, such as the user's finger, cheek, or other body part, or a touch pen or the like, that can change the capacitance of the touch pad 102 becomes close enough to the touch pad 102 to in fact change the capacitance of the touch pad 102.

Furthermore, in the following description, selection of a button on the touch pad 102 by the user touching the touch pad 102 with a finger or the like is also referred to as pressing or holding down a button.

Buttons are of the following two types. One type of button (hereinafter referred to as a "regular button") is allocated to a single process. The other type of button (hereinafter referred to as a "multifunction button") performs different processing when pushed briefly (hereinafter referred to as a "short push") than when pushed for at least a predetermined length of time (hereinafter referred to as a "long push").

Hereinafter, as an example, the buttons indicated by the marks "0" through "9" are regular buttons, whereas the button indicated by the mark "*" (hereinafter referred to as the "* button") is a multifunction button.

Note that the types of buttons and the ordering of buttons in FIG. 1 are merely examples and may be changed as necessary.
<Structure>

Figure 2:
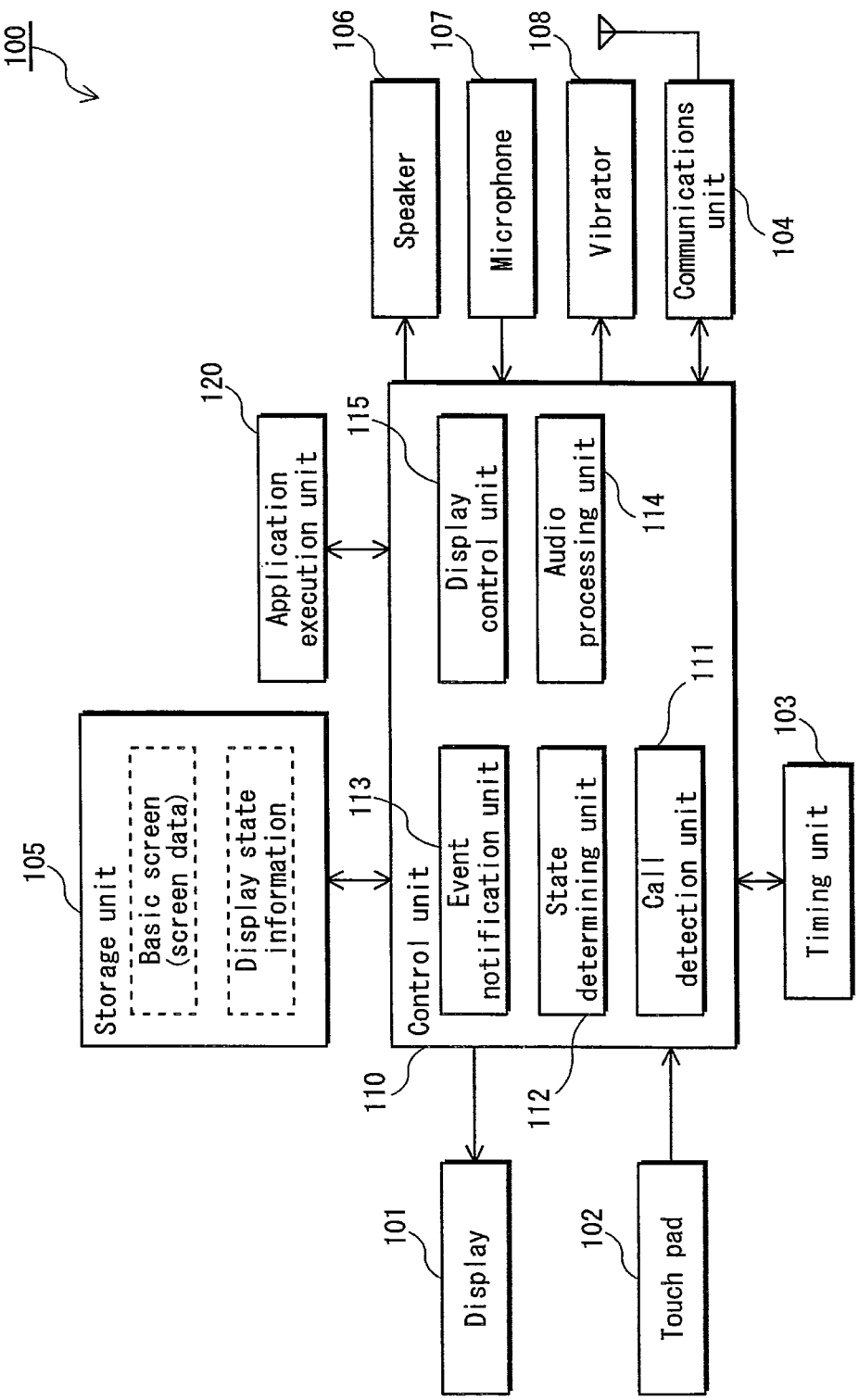
FIG. 2 is a block diagram showing the functional structure of the main components of the mobile phone 100.

FIG. 2 is a block diagram showing the functional structure of the main components of the mobile phone 100.

As shown in FIG. 2, the mobile phone 100 is provided with the display 101, the touch pad 102, a timing unit 103, a communications unit 104, a storage unit 105, the speaker 106, the microphone 107, a vibrator 108, a control unit 110, and an application execution unit 120.

The mobile phone 100 includes a processor and a memory. The functions of the control unit 110 and of the application execution unit 120 are implemented by the processor executing programs stored in the memory. FIG. 2 also shows the relationship between the main functional components in order to achieve the characteristics of the present invention.

The display 101 includes a Liquid Crystal Display (LCD) and a circuit for receiving instructions from the control unit 110 and displaying images, such as characters, on the LCD.

The touch pad 102 is implemented by a typical touch sensor based on capacitance. The touch pad 102 is a circuit that detects a touch by the user and, while the touch is being detected, outputs a combination of values to the control unit 110 every unit of time (for example, 1/60 of a second), namely the (x, y) coordinates of the position of the touch and a value representing the capacitance. In particular, when a plurality of positions are touched, the touch pad 102 outputs a plurality of combinations of the values.

The timing unit 103 is implemented by a timer or a counter. The timing unit 103 has the functions to begin timing in response to an instruction from the control unit 110 and to notify the control unit 110 after a long-push starting time (for example, one second) has elapsed and after a long-push ending time (for example, three seconds) has elapsed.

While details are provided below, the long-push starting time and the long-push ending time are used when determining whether the touch by the user is a short push or a long push, and whether the touch corresponds to a normal operation by the user or to the ear or the like touching the touch pad 102 (hereinafter referred to as an "erroneous operation"). The long-push starting time and the long-push ending time are set in advance by the manufacturer or the like of the mobile phone 100.

The communications unit 104 is a circuit for sending and receiving radio waves to and from a base station via an antenna. The communications unit 104 has the function of demodulating received signals and transmitting the demodulated signals to the control unit 110, and of modulating signals received from the control unit 110 and transmitting the modulated signals.

The storage unit 105 is a memory region for storing basic screen data and display state information.

The basic screen data are, for example, data for images displayed on the display 101 while dialing or during a call.

The display state information indicates the state of the screen being displayed on the display 101 and identifies how the screen is generated.

For example, the display state information for the screen displayed by the display 101 shown in FIG. 1 indicates that the screen has gone from a standby display (in this example, a screen in which nothing is displayed) to having a "0" rendered thereon.

In addition to having the functions of a typical mobile phone, the control unit 110 also functions as the Operating System (OS) between the touch pad 102 and applications. The control unit 110 includes a call detection unit 111, a state determining unit 112, an event notification unit 113, an audio processing unit 114, and a display control unit 115. The control unit 110 manages the arrangement (coordinate range) of each button on the touch pad 102.

The call detection unit 111 has the function of determining whether a call is in progress in the mobile phone 100 by detecting the start and the end of a call based on user operations and on the content of communication with the base station via the communications unit 104. Specifically, when a ringing signal is received and the button with the "TALK" mark is operated (off-hook operation), the call detection unit 111 detects that a call has started. After a call has started, the call detection unit 111 detects the end of the call when the button with the "END" mark is operated (on-hook operation). After detecting the start of a call, the call detection unit 111 determines that the call is in progress until detecting the end of the call.

By receiving the combination of the coordinates and the value representing the capacitance from the touch pad 102, the state determining unit 112 has the functions of both detecting the input from the touch pad 102 and of determining the input state of the touch pad 102 based on the detection results, the results of determination by the call detection unit 111, and the notification from the timing unit 103. While described in detail below (see FIG. 3), the input states include a state indicating that the touching of a button has begun. Upon a transition to this state, the state determining unit 112 causes the timing unit 103 to start timing.

In response to a change in the input state determined by the state determining unit 112, the event notification unit 113 has the function of notifying the application execution unit 120 of an event indicating the change in the input state.

The audio processing unit 114 has the function of performing Digital/Analog (D/A) conversion on an audio signal received via the communications unit 104 and outputting the result to the speaker 106, as well as the function of performing Analog/Digital (A/D) conversion on an audio signal input from the microphone 107 and transmitting the generated signal via the communications unit 104. The above audio signals include Dial Tone Multi Frequency (DTMF) tones.

In accordance with instructions from the application execution unit 120, the display control unit 115 has the function of displaying images and the like on the display 101 and the function of updating the display state information in the storage unit 105.

The application execution unit 120 functions as an event-driven application that performs processing in response to events as notified by the control unit 110. The specific processing performed by the application execution unit 120 is described below (see FIG. 6).

<Input States>

The following describes the input states of the touch pad 102.

Figure 3:
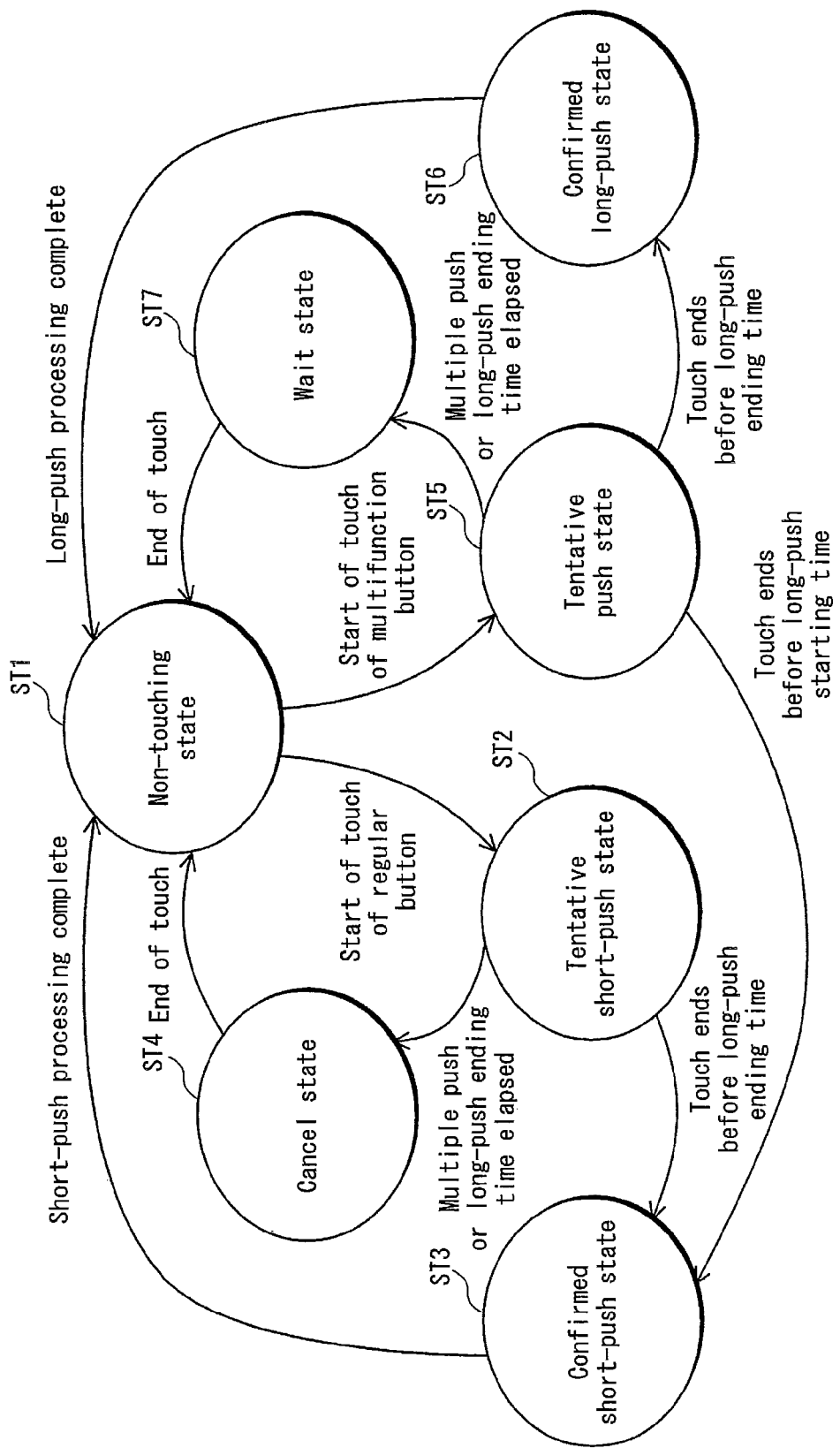
FIG. 3 is a state transition diagram illustrating changes in the input state of a touch pad 102 during a call by the mobile phone 100.

FIG. 3 is a state transition diagram illustrating changes in the input state of the touch pad 102 during a call by the mobile phone 100.

Note that "end of touch" in FIG. 3 indicates that a touch has been released.

As shown in FIG. 3, the input states of the touch pad 102 are a non-touching state ST1, a tentative short-push state ST2, a confirmed short-push state ST3, a cancel state ST4, a tentative push state ST5, a confirmed long-push state ST6, and a wait state ST7.

The non-touching state ST1 indicates that the touch pad 102 is not being touched at all. When the touch of a button on the touch pad 102 begins, the input state transitions to either the tentative short-push state ST2 or the tentative push state ST5, depending on the type of button for which the touch has begun.

The tentative short-push state ST2 indicates the start of a touch of a regular button. In this state, it cannot yet be determined whether the touch that has begun is due to user operation or is an erroneous operation. From this state, the confirmed short-push state ST3 or the cancel state ST4 is transitioned to depending on the elapsed time from the start of the touch of the regular button and on whether at least a predetermined number of buttons are being touched (hereinafter referred to as a "multiple push").

As an example, the following describes a multiple push as occurring when eight or more buttons are pressed.

The confirmed short-push state ST3 indicates that the touch of a regular button has been released in less than the long-push ending time, or that the touch of a multifunction button has been released in less than the long-push starting time. This state also indicates that the touch has been determined to be a normal user operation (a press of a regular button, or a short push of a multifunction button). From this state, the non-touching state ST1 is transitioned to upon performance of processing corresponding to the regular button on which the touch has been released, or to the short push of the multifunction button (hereinafter referred to as "short-push processing") on which the touch has been released.

The cancel state ST4 indicates that either the long-push ending time has elapsed after the beginning of the touch of a regular button without the touch being released, or that a multiple push has occurred. In this state, it is determined that the touch is an erroneous operation. From this state, the non-touching state ST1 is transitioned to upon release of the touch.

The tentative push state ST5 indicates that a touch of a multifunction button has begun. In this state, it cannot be determined whether the touch is a normal user operation (a short push or a long push) or an erroneous operation. Depending on the elapsed time after the start of the touch of the multifunction button, and on whether a multiple push occurs, one of the following states is transitioned to from this state: the confirmed short-push state ST3, the confirmed long-push state ST6, or the wait state ST7.

The confirmed long-push state ST6 indicates that after the start of the touch of a multifunction button, the touch has been released after the long-push starting time has elapsed and before the long-push ending time has elapsed. In this state, it is determined that the touch is a long push of the multifunction button by the user. From this state, the non-touching state ST1 is transitioned to upon performance of processing corresponding to the long push of the multifunction button (hereinafter referred to as "long-push processing") on which the touch has been released.

The wait state ST7 indicates that either the long-push ending time has elapsed after the beginning of the touch of a multifunction button without the touch being released, or that a multiple push has occurred. In this state, it is determined that the touch is an erroneous operation. From this state, the non-touching state ST1 is transitioned to upon release of the touch.

The input states of the touch pad 102 during a call have been described. When a call is not in progress, the input states of the touch pad 102 differ by not including the tentative short-push state ST2, the cancel state ST4, and the wait state ST7. This is because when a call is not in progress, an erroneous operation caused by the ear or the like touching the touch pad 102 generally does not occur. When the mobile phone 100 is placed inside a bag or the like, a malfunction may occur due to contact with another item in the bag. In this embodiment, however, malfunction is prevented by, for example, a so-called key-lock function to invalidate input from the touch pad 102 by performing a predetermined operation in advance.

The input state of the touch pad 102 when a call is not in progress transitions as follows.

When a touch of a regular button begins during the non-touching state ST1, the input state transitions to the confirmed short-push state ST3, and short-push processing is performed. When the touch is released, the input state returns to the non-touching state ST1.

When a touch of a multifunction button begins during the non-touching state ST1, the input state transitions to the tentative push state ST5. If the touch is released before the long-push starting time elapses, the input state transitions to the confirmed short-push state ST3, short-push processing is performed, and the input state returns to the non-touching state ST1.

On the other hand, during the tentative push state ST5, if the touch is released after the long-push starting time elapses, the input state transitions to the confirmed long-push state ST6. Long-push processing is performed, and the input state returns to the non-touching state ST1.

<Operations>

Next, operations by the mobile phone 100 provided with the above structure are described with reference to FIGS. 4 to 6.

Processing by the control unit 110 is first described with reference to FIGS. 4 and 5, and then processing by the application execution unit 120 is described with reference to FIG. 6.

<Processing by Control Unit 110>

Figure 4:
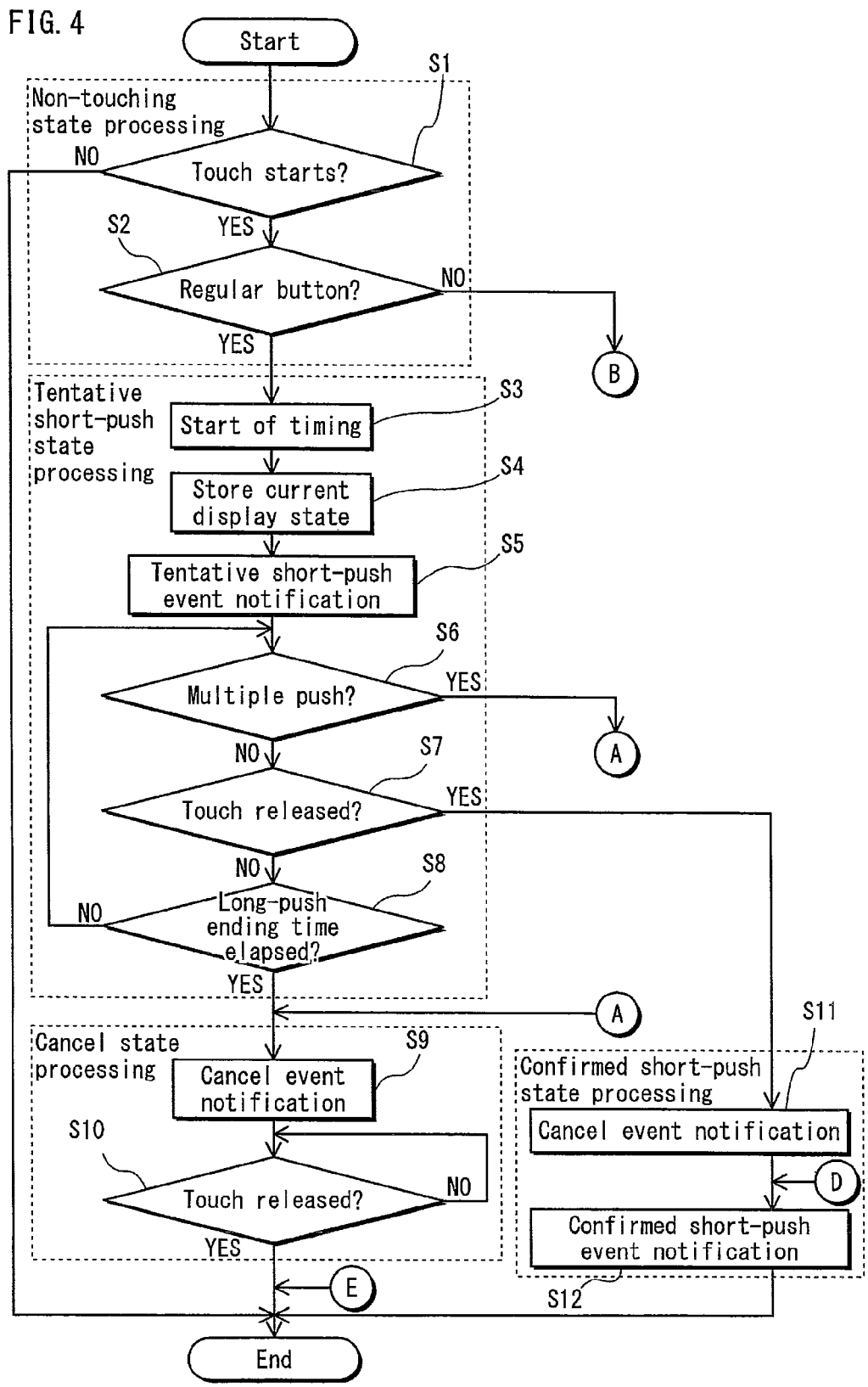
FIG. 4 is a flowchart, continued in FIG. 5, showing control processing by the mobile phone 100 in response to input from the touch pad 102 during a call.
Figure 5:
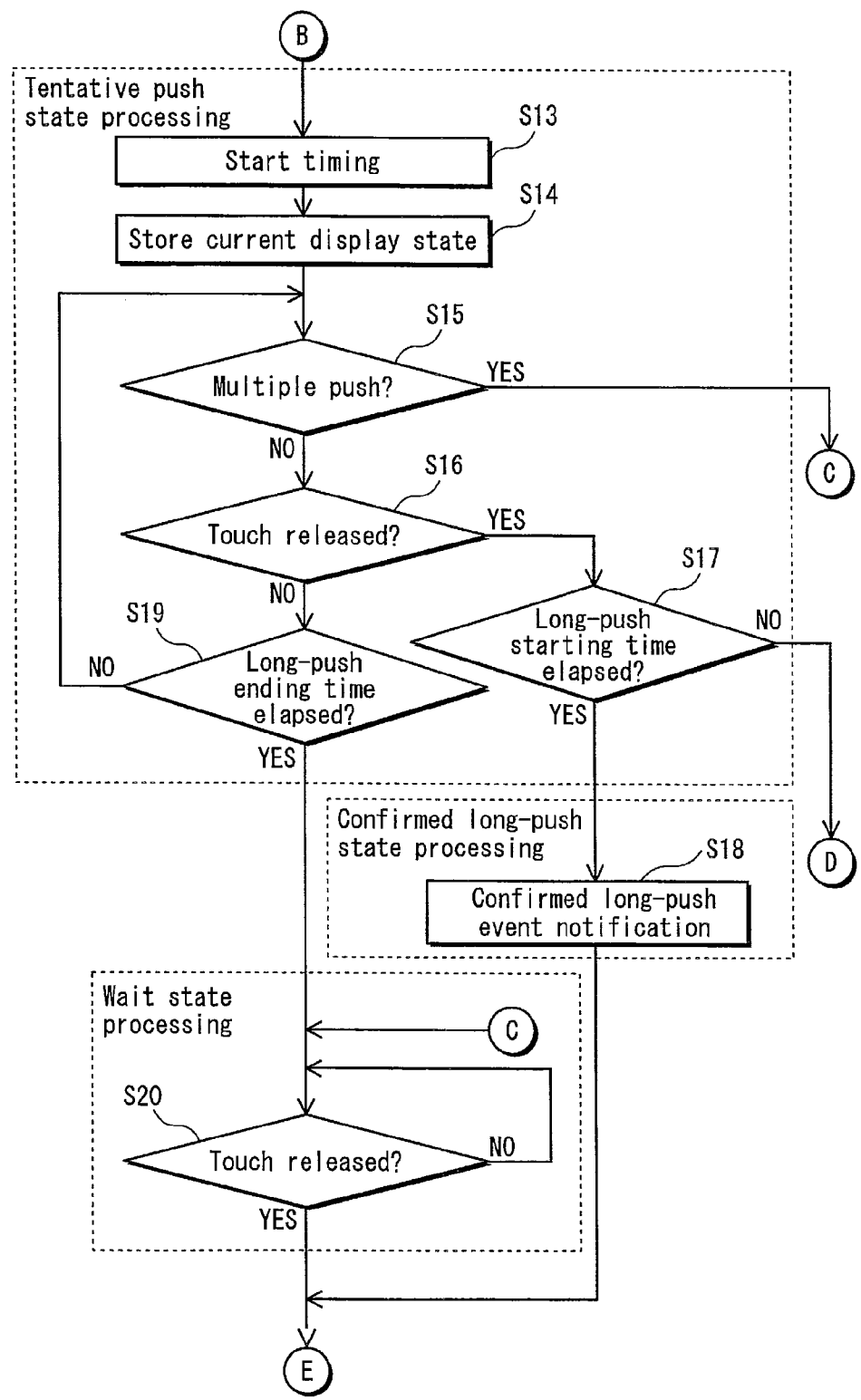
FIG. 5 is a flowchart, continued from FIG. 4, showing control processing by the mobile phone 100 in response to input from the touch pad 102 during a call.

FIGS. 4 and 5 are flowcharts showing control processing by the mobile phone 100 in response to input from the touch pad 102 during a call.

Non-touching state processing, tentative short-push state processing, confirmed short-push state processing, cancel state processing, tentative push state processing, confirmed long-push state processing, and wait state processing, which are indicated by dotted lines in FIGS. 4 and 5, indicate the processing performed by the control unit 110 respectively during the non-touching state ST1, the tentative short-push state ST2, the confirmed short-push state ST3, the cancel state ST4, the tentative push state ST5, the confirmed long-push state ST6, and the wait state ST7.

When the call detection unit 111 detects that a call is in progress, and the touch pad 102 is in the non-touching state ST1, the state determining unit 112 of the control unit 110 repeatedly (for example, every 1/60 of a second) determines whether a touch has begun (step S1 in FIG. 4).

When the combination of the coordinates and the value representing the capacitance (hereinafter referred to as the "coordinates and the like") has not been received from the touch pad 102, the state determining unit 112 determines that a touch has not begun (step S1: NO) and control processing ends. Upon receipt of the coordinates and the like from the touch pad 102, the state determining unit 112 determines that a touch has begun (step S1: YES) and determines whether the button corresponding to the received coordinates is a regular button (step S2). Note that when a plurality of combinations of the coordinates and the value representing the capacitance are received from the touch pad 102, the state determining unit 112 determines whether the coordinates of the button corresponding to the pair with the largest value representing the capacitance is a regular button.

When the corresponding button is a regular button (step S2: YES), the state determining unit 112 determines that the input state has transitioned from the non-touching state ST1 to the tentative short-push state ST2 and causes the timing unit 103 to start timing (step S3). In other words, the timing unit 103 measures the time that elapses from when the regular button starts being touched.

The display control unit 115 updates the display state information of the storage unit 105 so as to show the current screen state (step S4). The way in which the display state information is updated is described below using a specific example (see FIGS. 9 and 10).

The event notification unit 113 notifies the application execution unit 120 of a tentative short-push event (step S5). The tentative short-push event is an event indicating that the input state has transitioned to the tentative short-push state ST2 and includes identifying information on the button that is being touched (hereinafter referred to as "button information").

The state determining unit 112 determines whether a multiple push has occurred (step S6). Specifically, the state determining unit 112 determines whether the coordinates and the like have been received from the touch pad 102, and whether the number of buttons corresponding to the coordinates from the touch pad 102, i.e. the number of buttons being touched, totals eight or more. If so, the state determining unit 112 determines that a multiple push has occurred (step S6: YES), and processing proceeds to step S9, described below.

In step S6, when the number of buttons being touched is fewer than eight, the state determining unit 112 determines that a multiple push has not occurred (step S6: NO) and then determines whether the touch has been released (step S7).

Specifically, the state determining unit 112 determines whether the coordinates and the like have been received from the touch pad 102, and if so, determines that the touch has not been released (step S7: NO). The state determining unit 112 then determines whether the long-push ending time has elapsed since the start of the touch (step S8).

After step S3, if no notification has been received from the timing unit 103 that the long-push ending time has elapsed, the state determining unit 112 determines that the long-push ending time has not elapsed (step S8: NO), and processing begins again from step S6.

In step S8, when notification indicating elapse of the long-push ending time has been received from the timing unit 103, the state determining unit 112 determines that the long-push ending time has elapsed (step S8: YES) and determines that the input state has transitioned from the tentative short-push state ST2 to the cancel state ST4. The event notification unit 113 notifies the application execution unit 120 of a cancel event (step S9).

The cancel event is an event indicating that the input state has transitioned to the cancel state ST4 and includes button information on the button that is being touched.

The state determining unit 112 determines whether the touch has been released (step S10). Specifically, the state determining unit 112 determines whether the coordinates and the like have been received from the touch pad 102, and if so, determines that the touch has not been released (step S10: NO). The state determining unit 112 performs the determination in step S10 again and determines that the touch has been released when the coordinates and the like have not been received from the touch pad 102 (step S10: YES). Control processing then ends.

In step S7, when the coordinates and the like have not been received from the touch pad 102, the state determining unit 112 determines that the touch has been released (step S7: YES). The state determining unit 112 then determines that the input state has transitioned from the tentative short-push state ST2 to the confirmed short-push state ST3, and the event notification unit 113 first notifies the application execution unit 120 of a cancel event (step S11).

In this case, the input state has transitioned to the confirmed short-push state ST3, not to the cancel state ST4. As described below, however, in the confirmed short-push state ST3 as well, the application execution unit 120 first needs to perform similar processing as when the input state transitions to the cancel state ST4. Notification of the cancel event is therefore provided. The button information for the button on which the touch was released is included in this cancel event.

After providing notification of the cancel event, the event notification unit 113 notifies the application execution unit 120 of a confirmed short-push event (step S12), and control processing ends.

The confirmed short-push event is an event indicating that the input state has transitioned to the confirmed short-push state ST3 and includes button information on the button on which the touch has been released.

On the other hand, in step S2, when the corresponding button is a multifunction button (step S2: NO), the state determining unit 112 determines that the input state has transitioned from the non-touching state ST1 to the tentative push state ST5 and causes the timing unit 103 to start timing (step S13). In other words, the timing unit 103 measures the time that elapses from when the multifunction button starts being touched.

As described below, during the tentative push state ST5, the application execution unit 120 need not perform any processing in particular. Therefore, the event notification unit 113 does not provide notification of an event indicating the transition to the tentative push state ST5.

The display control unit 115 updates the display state information of the storage unit 105 so as to show the current screen state (step S14).

The state determining unit 112 determines whether a multiple push has occurred, similar to step S6 (step S15). If so (step S15: YES), processing proceeds to step S20, described below. When a multiple push has not occurred (step S15: NO), the state determining unit 112 determines whether the touch has been released, similar to step S7 (step S16).

When the touch has been released (step S16: YES), the state determining unit 112 determines whether the long-push starting time has elapsed since the start of the touch (step S17).

Specifically, after the processing in step S13, if no notification has been received from the timing unit 103 that the long-push starting time has elapsed, the state determining unit 112 determines that the long-push starting time has not elapsed (step S17: NO) and that the input state has transitioned from the tentative push state ST5 to the confirmed short-push state ST3. The event notification unit 113 notifies the application execution unit 120 of a confirmed short-push event (step S12), and control processing ends.

In step S17, if notification has been received from the timing unit 103, after the processing in step S13, that the long-push starting time has elapsed, the state determining unit 112 determines that the long-push starting time has elapsed (step S17: YES) and that the input state has transitioned from the tentative push state ST5 to the confirmed long-push state ST6. The event notification unit 113 notifies the application execution unit 120 of a confirmed long-push event (step S18), and control processing ends.

The confirmed long-push event is an event indicating that the input state has transitioned to the confirmed long-push state ST6 and includes button information on the button on which the touch has been released.

In step S16, if the touch has not been released (step S16: NO), the state determining unit 112 determines whether the long-push ending time has elapsed since the start of the touch, similar to step S17 (step S19).

When the long-push ending time has not elapsed (step S19: NO), processing starts again from step S15. When the long-push ending time has elapsed (step S19: YES), the state determining unit 112 determines that the input state has transitioned from the tentative push state ST5 to the wait state ST7.

As during the tentative push state ST5, during the wait state ST7 as well the application execution unit 120 need not perform any processing in particular, as described below. Therefore, the event notification unit 113 does not provide notification of an event indicating the transition to the wait state ST7.

The state determining unit 112 determines whether the touch has been released, similar to step S10 (step S20). When the touch has not been released (step S20: NO), the determination in step S20 is performed again. When the touch has been released (step S20: YES), control processing ends.

<Processing by Application Execution Unit 120>

Next, the processing by the application execution unit 120 is described.

Figure 6:
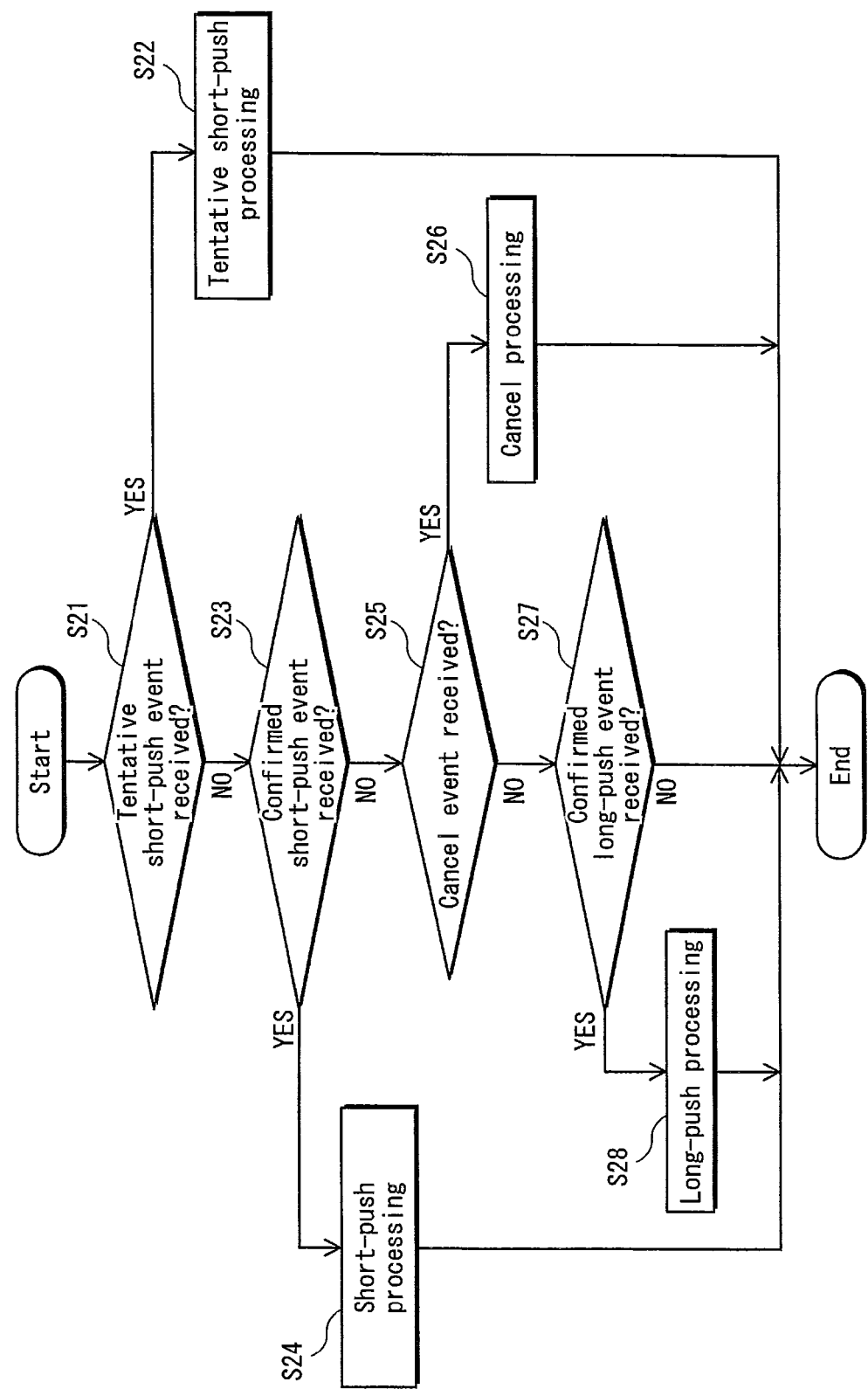
FIG. 6 is a flowchart showing application processing in the mobile phone 100.

FIG. 6 is a flowchart showing application processing in the mobile phone 100.

The application execution unit 120 repeatedly executes the application processing described below.

The application execution unit 120 determines whether a tentative short-push event has been received from the control unit 110 (step S21). When a tentative short-push event has been received (step S21: YES), the application execution unit 120 performs tentative short-push processing (step S22), and application processing ends.

The tentative short-push processing is, for example, processing to instruct the display control unit 115 of the control unit 110 to display, on the display 101, a number or the like of the button indicated by the button information included in the tentative short-push event.

In step S21, when a tentative short-push event has not been received (step S21: NO), the application execution unit 120 determines whether a confirmed short-push event has been received from the control unit 110 (step S23). If so (step S23: YES), the application execution unit 120 performs short-push processing (step S24), and application processing ends.

Short-push processing is similar to the processing allocated to the button that was touched and includes tentative short-push processing. For example, short-push processing instructs the display control unit 115 of the control unit 110 to display, on the display 101, a number or the like of the regular button indicated by the button information included in the confirmed short-push event and also instructs the control unit 110 to transmit or otherwise process the DTMF tone corresponding to the regular button. When using a service such as telephone banking with a financial institution, if a button were pressed due to erroneous operation and a DTMF tone is transmitted, a transaction the user did not intend would be performed. Therefore, output of the DTMF tone should be suppressed in the case of an erroneous operation.

In step S23, when a confirmed short-push event has not been received (step S23: NO), the application execution unit 120 determines whether a cancel event has been received from the control unit 110 (step S25). If so (step S25: YES), the application execution unit 120 performs cancel processing (step S26), and application processing ends.

Cancel processing is processing to undo the tentative short-push processing of step S22. In the above example of tentative short-push processing, the cancel processing instructs the display control unit 115 of the control unit 110 to return the display on the display 101 to the state before the tentative short-push processing was performed based on the display state information stored in the storage unit 105, i.e. to a state in which the number or the like of the regular button indicated by the button information included in the tentative short-push event is not displayed.

In step S25, when a cancel event has not been received (step S25: NO), the application execution unit 120 determines whether a confirmed long-push event has been received from the control unit 110 (step S27). If so (step S27: YES), the application execution unit 120 performs long-push processing (step S28), and application processing ends.

This long-push processing refers to the long-push processing of the multifunction button indicated by the button information included in the confirmed long-push event. As an example, the long-push processing for the * button is described below as being processing to invoke a three-way call function, automatically dial a preregistered telephone number, and instruct the display control unit 115 of the control unit 110 to display the telephone number on the display 101. If a long push of the * button were performed by an erroneous operation and the telephone number dialed automatically, a charge would be incurred when the other party answered. Therefore, automatic dialing should be suppressed in the case of an erroneous operation.

In step S27, when a confirmed long-push event has not been received (step S27: NO), application processing ends without any processing in particular being performed.

As described above, short-push processing is similar to the processing allocated to the button that was touched (hereinafter referred to as "corresponding processing"), and includes tentative short-push processing. Before providing notification of a confirmed short-push event related to short-push processing (in FIG. 4, step S12), the event notification unit 113 provides notification of a cancel event (in FIG. 4, step S11). Therefore, the application execution unit 120 performs the portion of the corresponding processing other than the tentative short-push processing by performing short-push processing after performing cancel processing.

By performing short-push processing after performing cancel processing, the processing other than the tentative short-push processing need not be managed separately. In other words, it is not necessary to manage which portion of the corresponding processing has not yet been performed.

<Processing when Call is not in Progress>

The following describes operations by the control unit 110 when a call is not in progress.

Figure 7:
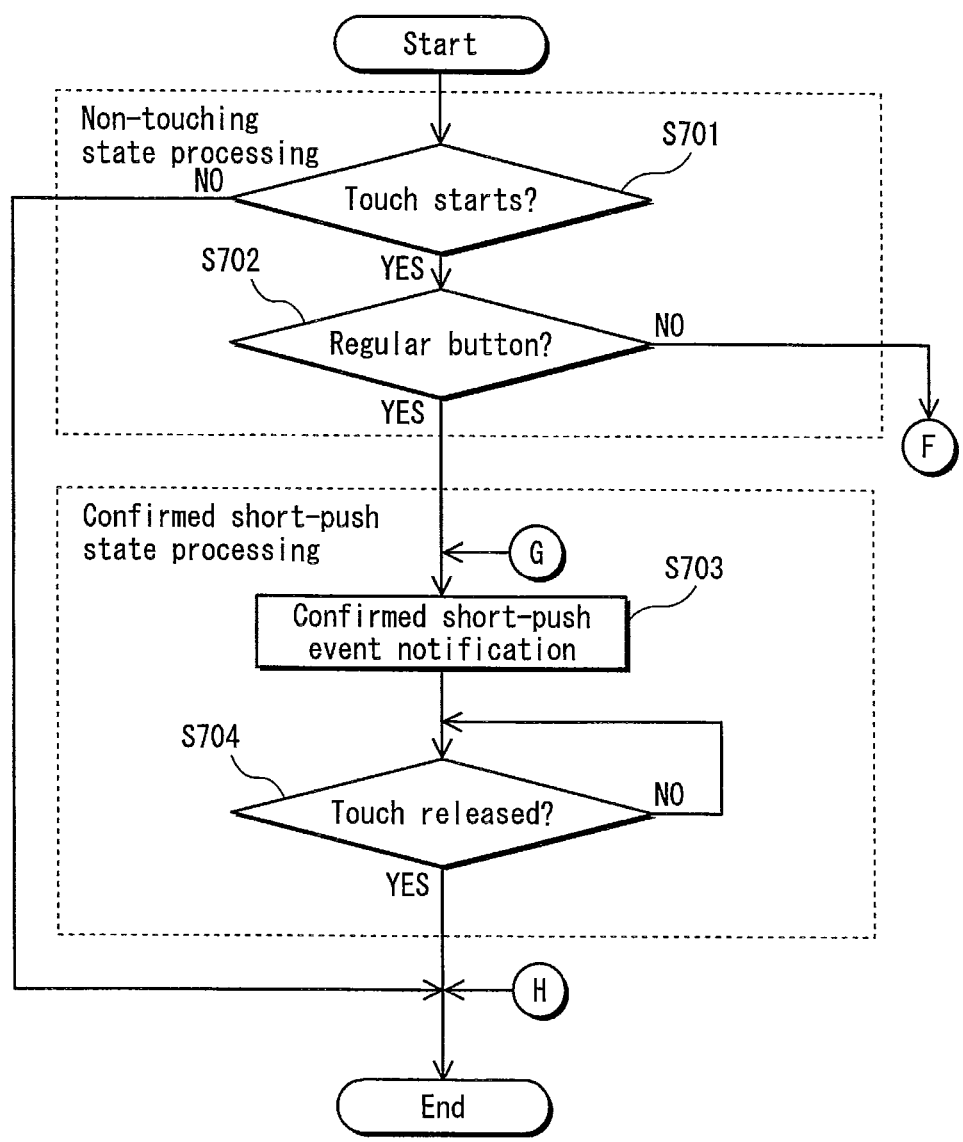
FIG. 7 is a flowchart, continued in FIG. 8, showing control processing by the mobile phone 100 in response to input from the touch pad 102 when a call is not in progress.
Figure 8:
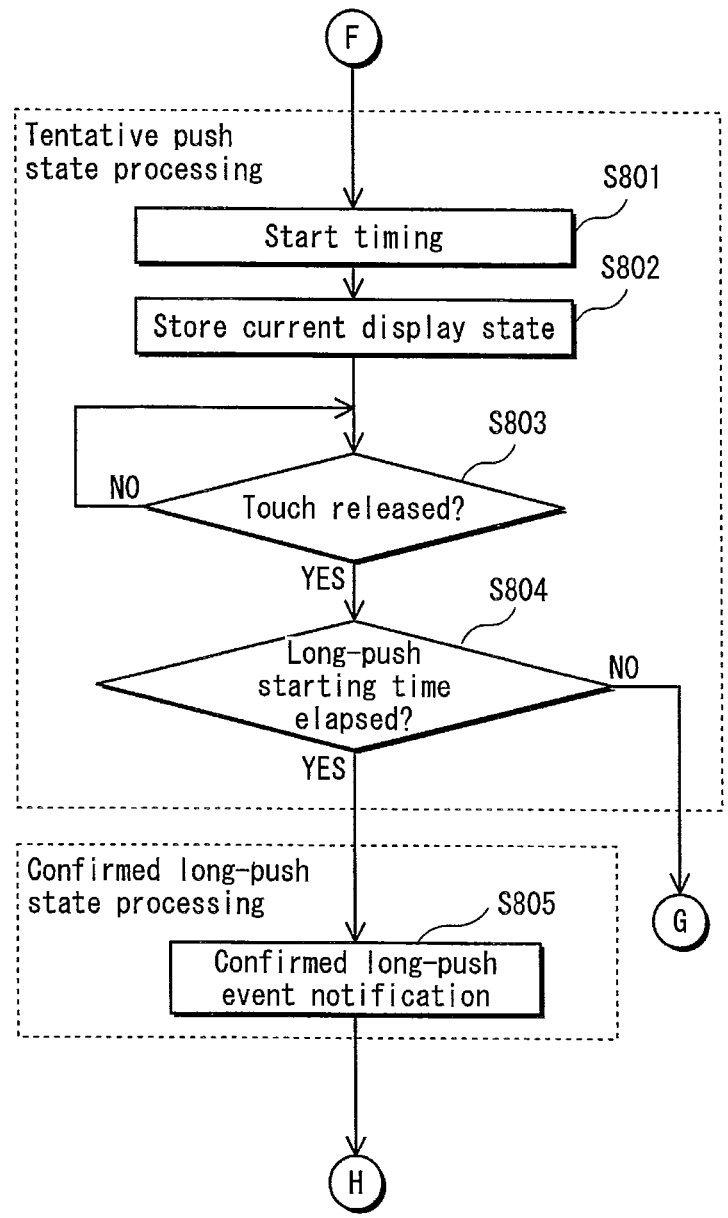
FIG. 8 is a flowchart, continued from FIG. 7, showing control processing by the mobile phone 100 in response to input from the touch pad 102 when a call is not in progress.

FIGS. 7 and 8 are flowcharts showing control processing by the mobile phone 100 in response to input from the touch pad 102 when a call is not in progress.

When the call detection unit 111 detects that a call is in progress, the state determining unit 112 of the control unit 110 determines whether a touch has begun (step S701) and determines whether the button corresponding to the received coordinates is a regular button (step S702) as described in steps S1 and S2 in FIG. 4.

When the button corresponding to the received coordinates is a regular button (step S702: YES), the event notification unit 113 provides notification of a confirmed short-push event (step S703). Note that when a call is not in progress, notification of a tentative short-push event is not provided. Therefore, during the processing in the confirmed short-push state ST3, notification of a cancel event is not provided. This differs from when a call is in progress.

After the notification of the confirmed short-push event, the state determining unit 112 repeatedly determines whether the touch has been released, as in step S10 in FIG. 4 (step S704). When the touch has been released (step S704: YES), control processing ends.

On the other hand, in step S702, when the corresponding button is a multifunction button (step S702: NO), the state determining unit 112 causes the timing unit 103 to start timing (in FIG. 8, step S801).

As described in steps S14, S16, and S17 in FIG. 5, the display control unit 115 updates the display state information in the storage unit 105 (step S802), and the state determining unit 112 determines whether the touch has been released (step S803) and whether the long-push starting time has elapsed since the start of the touch (step S804).

When a call is not in progress, processing differs from when a call is in progress in that the determination of a multiple push (in FIG. 5, step S15) and the determination of whether the long-push ending time has passed (in FIG. 5, step S19) are not performed.

In step S804, when the long-push starting time has elapsed (in FIG. 8, step S804: YES), the event notification unit 113 provides notification of a confirmed long-push event (step S805), and control processing ends. When the long-push starting time has not elapsed (step S804: NO), the event notification unit 113 provides notification of a confirmed short-push event (in FIG. 7, step S703), and when the touch has been released (step S704: YES), control processing ends.

<Explanation of Operations Through a Concrete Example>

The above operations of the mobile phone 100 are now explained through a concrete example.

<Regular Button>

An example of operations when a touch of a regular button begins during a call is described with reference to FIGS. 4 to 6 and FIG. 9.

Figure 9:
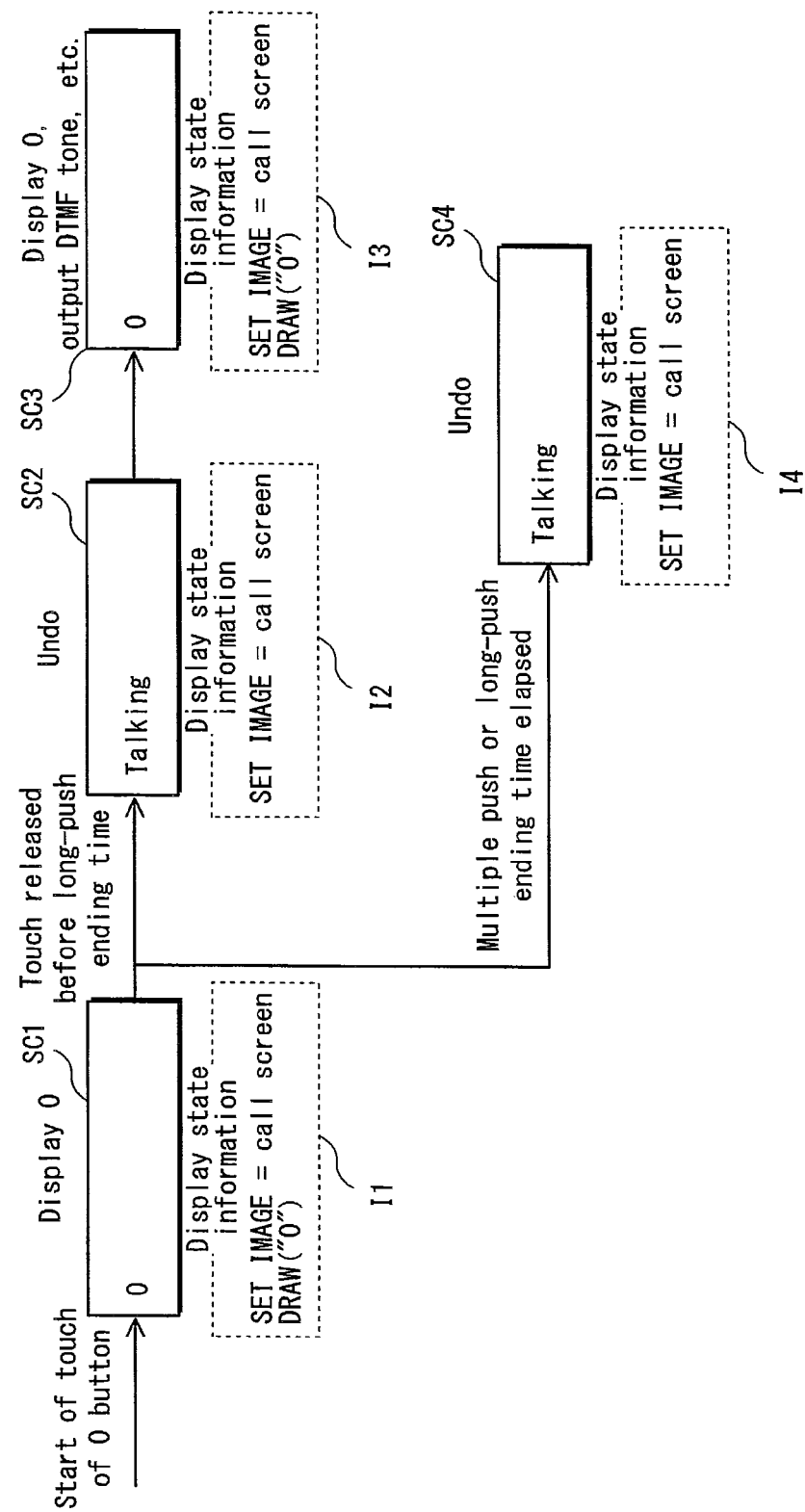
FIG. 9 shows a display example and an example of display state information when a touch of a regular button begins during a call.

FIG. 9 shows a display example and an example of display state information when a touch of a regular button begins during a call.

Note that at the point at which the following explanation begins, the screen being displayed is a screen displayed during a call (hereinafter referred to as a "call screen"), showing the character sequence "Talking". The regular button on which a touch begins is the button with the "0" mark (hereinafter referred to as the "0 button").

In this example, the call detection unit 111 has detected that a call is in progress, and the state determining unit 112 of the control unit 110 determines that a touch on the touch pad 102 has begun (in FIG. 4, step S1: YES). Since the button corresponding to the received coordinates (in this example, the 0 button) is a regular button (step S2: YES), the state determining unit 112 determines that the input state has transitioned from the non-touching state ST1 to the tentative short-push state ST2 and causes the timing unit 103 to start timing (step S3).

The display control unit 115 updates the display state information of the storage unit 105 to indicate that the current screen state is the call screen (as indicated by "SET IMAGE=call screen" in the display state information I1 in FIG. 9; step S4).

The event notification unit 113 notifies the application execution unit 120 of a tentative short-push event that includes button information indicating the 0 button (step S5).

Since the application execution unit 120 receives the tentative short-push event from the control unit 110 (in FIG. 6, step S21: YES), the application execution unit 120 performs tentative short-push processing to instruct the display control unit 115 of the control unit 110 to display, on the display 101, the number "0" of the 0 button indicated in the button information included in the tentative short-push event (step S22).

Having received this instruction, the display control unit 115 displays a "0" on the display 101 (see screen SC1 in FIG. 9) and updates the display state information of the storage unit 105 to indicate a state in which a 0 has been rendered after the call screen ("DRAW("0")" in the display state information I1 in FIG. 9).

When no multiple push occurs (in FIG. 4, step S6: NO) and the touch is released (step S7: YES), the state determining unit 112 determines that the input state has transitioned from the tentative short-push state ST2 to the confirmed short-push state ST3. The event notification unit 113 first notifies the application execution unit 120 of a cancel event that includes the button information for the 0 button on which the touch was released (step S11).

Since the application execution unit 120 receives the cancel event from the control unit 110 (in FIG. 6, steps S21: NO, S23: NO, and S25: YES), the application execution unit 120 performs cancel processing by instructing the display control unit 115 of the control unit 110 to set (undo) the display of the display 101, based on the display state information stored in the storage unit 105, to a state in which a 0 is not displayed (step S26).

Having received this instruction, the display control unit 115 displays the call screen, which is the same state as before display of the "0", based on the "SET IMAGE=call screen" at the top of the display state information; that is, the display control unit 115 sets the display 101 to a state in which the character sequence "Talking" is displayed (see screen SC2 in FIG. 9). The display control unit 115 then updates the display state information of the storage unit 105 to indicate that the current screen state is the call screen. In other words, the display control unit 115 deletes the "DRAW("0")" from the display state information (see the display state information 12 in FIG. 9).

Next, the event notification unit 113 notifies the application execution unit 120 of a confirmed short-push event that includes the button information of the 0 button on which the touch was released (in FIG. 4, step S12), and control processing ends.

Since the application execution unit 120 receives the confirmed short-push event from the control unit 110 (in FIG. 6, step S21: NO, step S23: YES), the application execution unit 120 performs short-push processing to instruct the display control unit 115 of the control unit 110 to display, on the display 101, the number "0" of the 0 button indicated in the button information included in the confirmed short-push event and to instruct the control unit 110 to transmit or otherwise process the DTMF tone corresponding to the 0 button indicated by the button information (step S24).

Having received the above instruction, the display control unit 115 displays a "0" on the display 101 (see screen SC3 in FIG. 9) and updates the display state information of the storage unit 105 to indicate a state in which a 0 has been rendered after the call screen. In other words, the display control unit 115 adds "DRAW("0")" to the display state information (see the display state information 13 in FIG. 9).

The audio processing unit 114 of the control unit 110 that received the above instruction transmits the DTMF tone corresponding to the 0 button to the other party in the call via the communications unit 104 and outputs the DTMF tone corresponding to the 0 button via the speaker 106. Control processing then ends.

The mobile phone 100 thus performs short-push processing that is the same as processing performed when the 0 button is pushed (corresponding processing) after performing cancel processing. Processing can thus be performed without a need to manage processing that has not yet been performed, i.e. processing other than the tentative short-push processing among the corresponding processing.

On the other hand, when a multiple push occurs (in FIG. 4, step S6: YES), or when the long-push ending time has elapsed (step S8: YES), the state determining unit 112 determines that the input state has transitioned from the tentative short-push state ST2 to the cancel state ST4. The event notification unit 113 notifies the application execution unit 120 of a cancel event that includes button information for the 0 button that is being touched (step S9).

Since the application execution unit 120 receives the cancel event from the control unit 110 (in FIG. 6, steps S21: NO, S23: NO, and S25: YES), the application execution unit 120 performs cancel processing by instructing the display control unit 115 of the control unit 110 to set (undo) the display of the display 101, based on the display state information stored in the storage unit 105, to a state in which a 0 is not displayed (step S26).

Having received this instruction, the display control unit 115 displays the call screen on the display 101, as in the screen SC2 in FIG. 9 (see screen SC4 in FIG. 9) and deletes the "DRAW("0")" from the display state information of the storage unit 105 (see the display state information 14 in FIG. 9).

The state determining unit 112 repeatedly determines whether the touch has been released (step S10). When the touch been released (step S10: YES), control processing ends.

In this way, when a multiple push occurs, or when the long-push ending time elapses, i.e. when it is determined that an erroneous operation has occurred, the DTMF tone is not output. This adequately prevents a serious malfunction from occurring, such as an unintended transaction being performed due to the user's ear or the like touching the touch pad 102 during use of a service such as telephone banking with a financial institution.

<Multifunction Button>

Next, an example of operations when a touch of a multifunction button begins during a call is described with reference to FIGS. 4 to 6 and FIG. 10.

Figure 10:
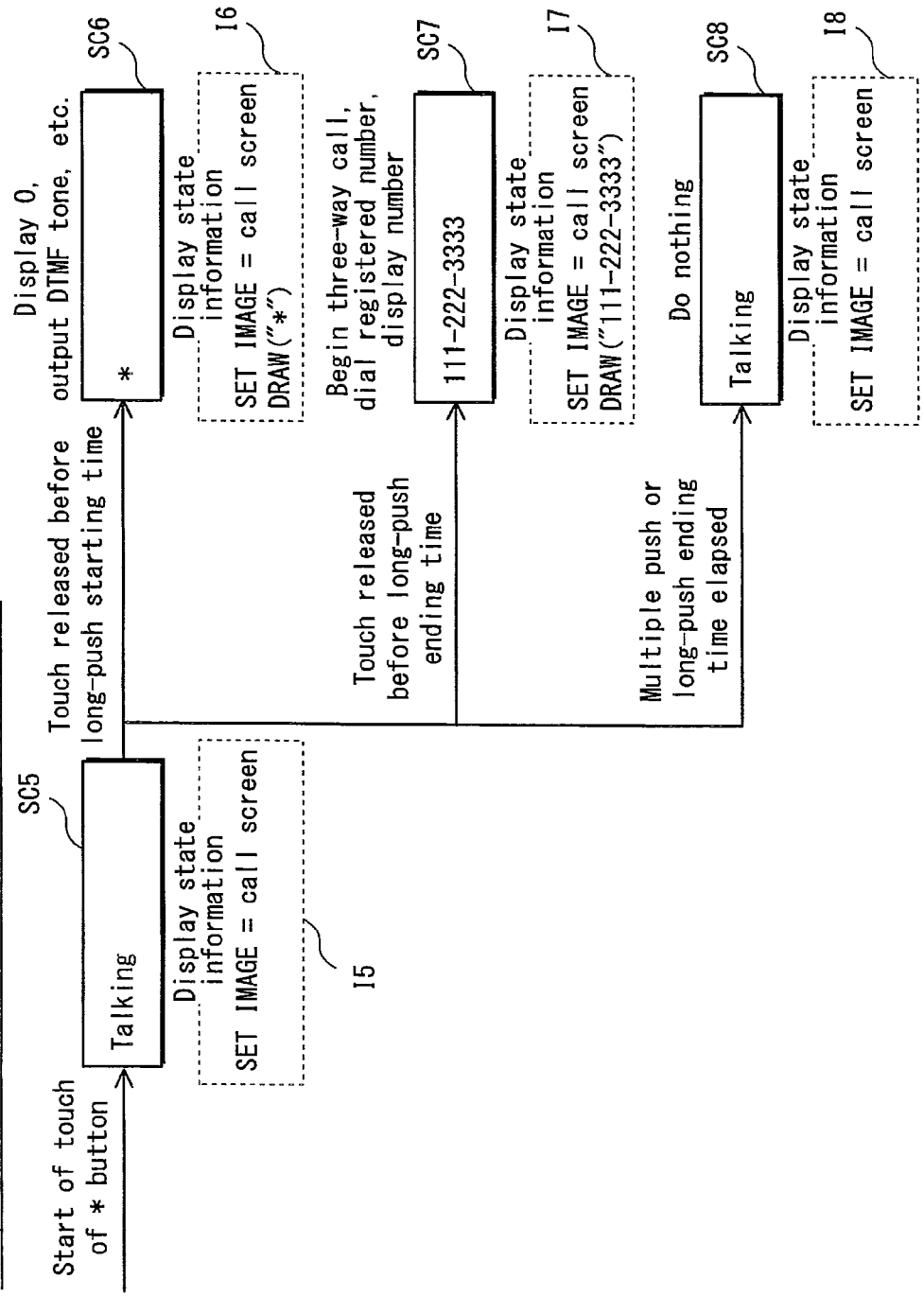
FIG. 10 shows a display example and an example of display state information when a touch of a multifunction button begins during a call.

FIG. 10 shows a display example and an example of display state information when a touch of a multifunction button begins during a call.

Note that at the start of the following explanation, it is assumed that the screen being displayed is the call screen, and that the multifunction button on which a touch has begun is the * button.

In this example, the call detection unit 111 has detected that a call is in progress, and the state determining unit 112 of the control unit 110 determines that a touch on the touch pad 102 has begun (step S1 of FIG. 4: YES). Since the button corresponding to the received coordinates (in this example, the * button) is a multifunction button (step S2: NO), the state determining unit 112 determines that the input state has transitioned from the non-touching state ST1 to the tentative push state ST5 and causes the timing unit 103 to start timing (step S13).

The display control unit 115 updates the display state information of the storage unit 105 to indicate that the current screen state is the call screen by adding "SET IMAGE=call screen" to the display state information (step S14: see the display state information 15 in FIG. 10).

In the case of a multifunction button being touched, it is typical to execute either short-push processing or long-push processing when the touch is released depending on the elapsed time from the start of the touch. Accordingly, when the touch of the multifunction button begins, i.e. upon transitioning to the tentative push state ST5, it can be assumed that the user will most likely not suffer the impression of a reduced response to input from the touch pad 102 even if the display of the display 101 is not particularly updated. In this embodiment, therefore, no processing related to the display is performed upon transitioning to the tentative push state ST5.

It follows that at this point, the screen displayed on the display 101 is still the call screen (see screen SC5 in FIG. 10).

If no multiple push occurs (in FIG. 5, step S15: NO) and the touch is released before the long-push starting time elapses after the start of the touch (steps S16: YES, S17: NO), then the state determining unit 112 determines that the input state has transitioned from the tentative push state ST5 to the confirmed short-push state ST3. The event notification unit 113 notifies the application execution unit 120 of a confirmed short-push event that includes button information for the * button on which the touch has been released (step S12), and control processing ends.

Since the application execution unit 120 receives the confirmed short-push event from the control unit 110 (in FIG. 6, steps S21: NO, S23: YES), the application execution unit 120 performs short-push processing for the * button indicated by the button information included in the confirmed short-push event (step S24). Specifically, the application execution unit 120 instructs the display control unit 115 of the control unit 110 to display, on the display 101, the mark "*" of the * button indicated in the button information included in the confirmed short-push event and instructs the control unit 110 to transmit or otherwise process the DTMF tone corresponding to the * button.

Having received the above instruction, the display control unit 115 displays a "*" on the display 101 (see screen SC6 in FIG. 10) and updates the display state information of the storage unit 105 to indicate a state in which a * has been rendered after the call screen. In other words, the display control unit 115 adds "DRAW("*")" to the display state information (see the display state information 16 in FIG. 10).

The audio processing unit 114 of the control unit 110 that received the above instruction transmits the DTMF tone corresponding to the * button to the other party in the call via the communications unit 104 and outputs the DTMF tone corresponding to the * button via the speaker 106. Control processing then ends.

After the start of the touch, if the touch is released after the long-push starting time elapses and before the long-push ending time elapses (steps S16: YES, S17: YES), then the event notification unit 113 notifies the application execution unit 120 of a confirmed long-push event that includes the button information for the * button on which the touch was released (step S18). Control processing then ends.

Since the application execution unit 120 receives the confirmed long-push event from the control unit 110 (in FIG. 6, steps S21: NO, S23: NO, S25: NO, S27: YES), the application execution unit 120 performs long-push processing for the * button indicated by the button information included in the confirmed long-push event (step S28). Specifically, the application execution unit 120 invokes the three-way call function, automatically dials a preregistered telephone number (in this example, 111-222-3333), and instructs the display control unit 115 of the control unit 110 to display the telephone number on the display 101.

Having received the above instruction, the display control unit 115 displays "111-222-3333" on the display 101 (see screen SC7 in FIG. 10) and updates the display state information of the storage unit 105 to indicate a state in which "111-222-3333" has been rendered after the call screen. In other words, the display control unit 115 adds "DRAW("111-222-3333")" to the display state information (see the display state information 17 in FIG. 10).

On the other hand, when a multiple push occurs (in FIG. 5, step S15: YES), or when the long-push ending time has elapsed (step S16: YES), the state determining unit 112 determines that the input state has transitioned from the tentative push state ST5 to the wait state ST7 and then repeatedly determines whether the touch has been released (step S20). When the touch has been released (step S20: YES), control processing ends.

Since the display control unit 115 does not receive any instruction from the application execution unit 120, the display on the display 101 does not particularly change (see screen SC8 in FIG. 10), nor does the display state information (see the display state information 18).

In this way, when a multiple push occurs, or when the long-push ending time elapses, i.e. when it is determined that an erroneous operation has occurred, neither short-push processing, i.e. output of a DTMF tone, nor long-push processing, i.e. automatic dialing for connection to another party by a three-way call, is performed. This adequately prevents a serious malfunction from occurring, such as an unintended transaction being performed, or charges being incurred.

<<Supplementary Explanation>>

While a mobile communication terminal according to the present invention has been described based on an embodiment, the following modifications are possible. The present invention is of course in no way limited to the mobile phone exactly as described in the above embodiment.

(1) The mobile phone 100 of the embodiment has been described as a straight-type mobile phone. As long as the mobile phone has a touch pad, however, the mobile phone may have a different external appearance, such as a folding phone, a sliding phone, or the like.

Figure 13:
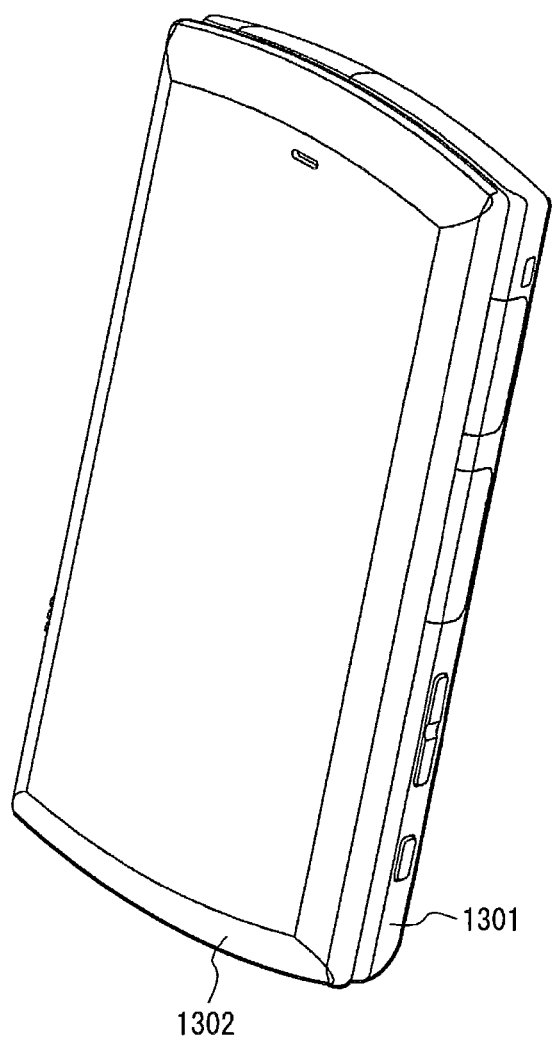
FIG. 13 is a perspective view showing a closed state of a folding mobile phone according to an embodiment of the present invention.
Figure 14:
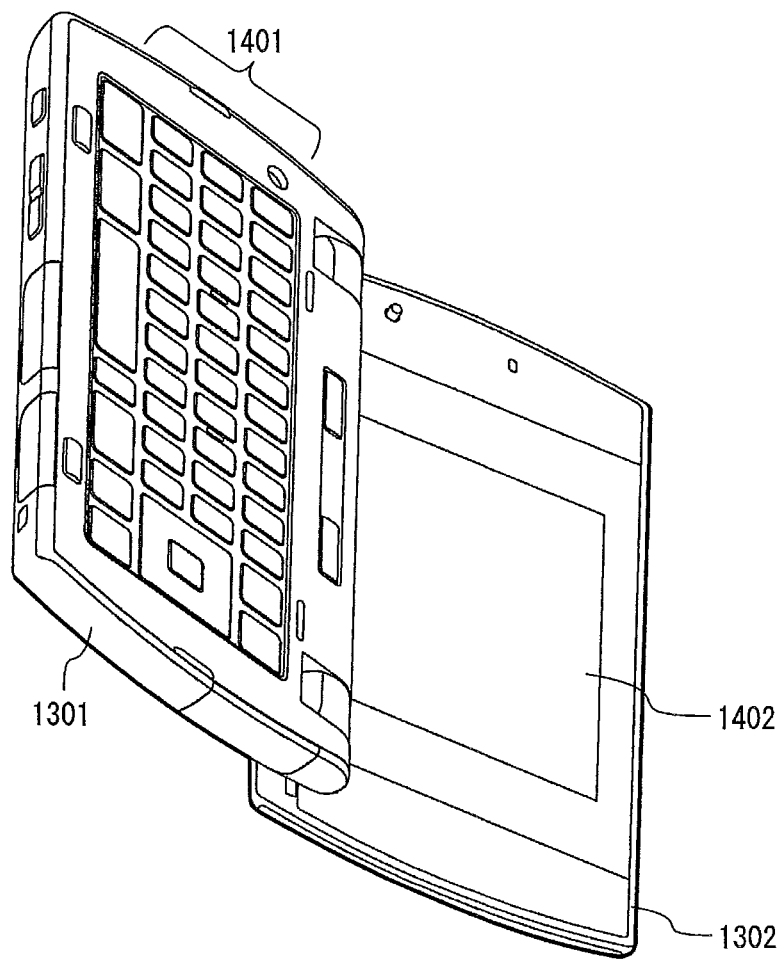
FIG. 14 is a perspective view showing an open state of the folding mobile phone according to an embodiment of the present invention.
Figure 15:
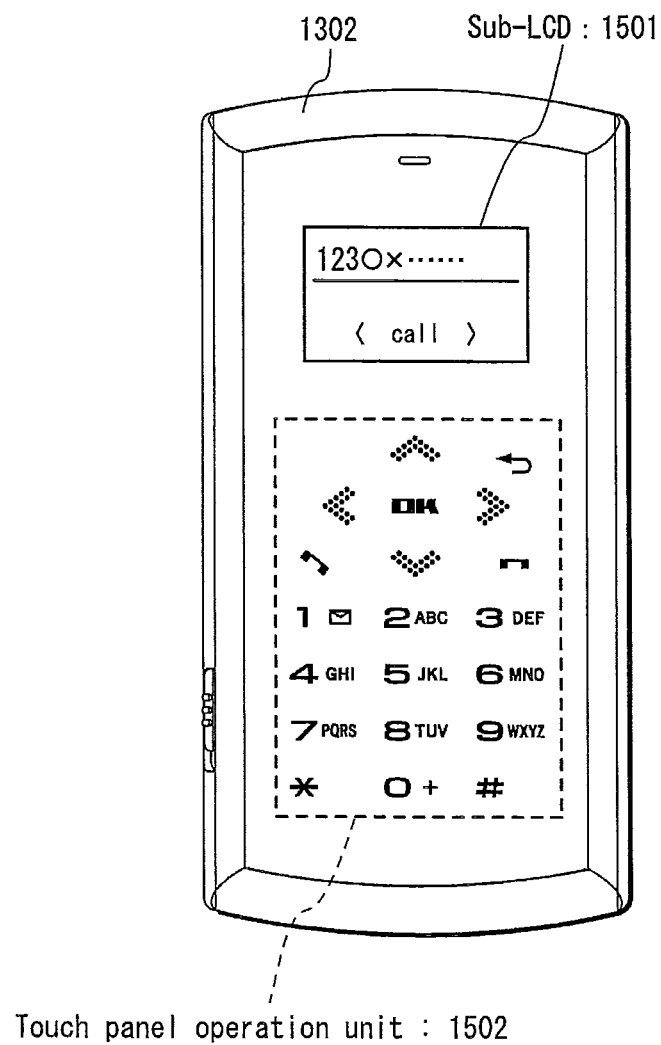
FIG. 15 is a front view showing a closed state of the folding mobile phone according to an embodiment of the present invention.

For example, the mobile phone may be a folding phone as shown in FIGS. 13 to 15.

This example of a folding mobile phone opens sideways, as shown in FIGS. 13 to 15. As shown in FIGS. 13 and 14, in this sideways-opening mobile phone, a first housing 1301 provided with input keys 1401 and a second housing 1302 provided with an LCD 1402, which is a screen for displaying information, can open and close with respect to each other. As shown in FIG. 15, the mobile phone also includes a sub-LCD 1501 and a touch panel operation unit 1502 on the surface of the second housing 1302 that is exposed when the mobile phone is closed. The sub-LCD 1501 serves as a display unit, and the operation unit 1502 serves as a touch pad.

(2) As shown in FIG. 1, the mobile phone 100 according to the embodiment has been described as having a separate display 101 and touch pad 102. The display 101 and the touch pad 102 may, however, be combined to form a so-called touch panel.

FIGS. 11A and 11B illustrate an example of operations of a mobile phone 200 provided with a touch panel 201.

Other than being provided with the touch panel 201 instead of the display 101 and the touch pad 102 in the mobile phone 100, the mobile phone 200 has a similar structure to the mobile phone 100.

As shown in FIG. 11A, the mobile phone 200 displays buttons and the like on the touch panel 201 during a call. A user performs a variety of operations by touching the buttons with a finger or the like.

FIG. 11A shows a user touching the 0 button on the touch panel 201 with a finger, and FIG. 11B shows the screen that is displayed after the 0 button is touched.

The mobile phone 200 with the touch panel 201 operates similarly to the mobile phone 100 in the embodiment. Specifically, if for example a touch of the 0 button begins during a call (the 0 button being a regular button in this example), the mobile phone 200 determines that the input state has transitioned from the non-touching state ST1 to the tentative short-push state ST2 and displays the screen shown in FIG. 11B. If the touch is released before the long-push ending time, the mobile phone 200 transmits or otherwise processes the DTMF tone corresponding to the 0 button. On the other hand, if the long-push ending time elapses after the start of the touch, or if a multiple push occurs, the mobile phone 200 updates the display of the touch panel 201 to the call screen shown in FIG. 11A without transmitting or otherwise processing the DTMF tone corresponding to the 0 button.

(3) The mobile phone 200 shown in FIGS. 11A and 11B and described in (2) is implemented with one touch panel 201 that combines a unit for operations and a unit for displaying characters and the like on which operations are performed. The present invention is not, however, limited to this case. For example, the unit for inputting numbers, characters, and the like may be a touch panel as shown in FIGS. 11A and 11B, whereas the unit for displaying the input characters and the like may be an LCD, an organic Electro-Luminescence (EL) display, or the like.

The display device used in the touch panel described in (2) and here is not limited to displaying characters and the like with an LCD that displays images and the like. For example, a combination of a lighting unit and a transmissive sheet disposed on the lighting unit may be used, the transmissive sheet including transmissive portions in the shape of characters and designs. In this case, the user inputs a certain character on the transmissive sheet by pressing a location on the transmissive sheet corresponding to the transmissive portion in the shape of the character, thereby changing the capacitance of the touch pad 102.

(4) As shown in FIG. 3, the mobile phone 100 according to the embodiment has been described as transitioning from the non-touching state ST1 to either the tentative short-push state ST2 or the tentative push state ST5 when a button is touched depending on whether the button corresponding to the touch location is a regular button or a multifunction button. The following modifications, however, are also possible. The mobile phone in the following modifications is referred to as a "modified mobile phone".

Figure 12:
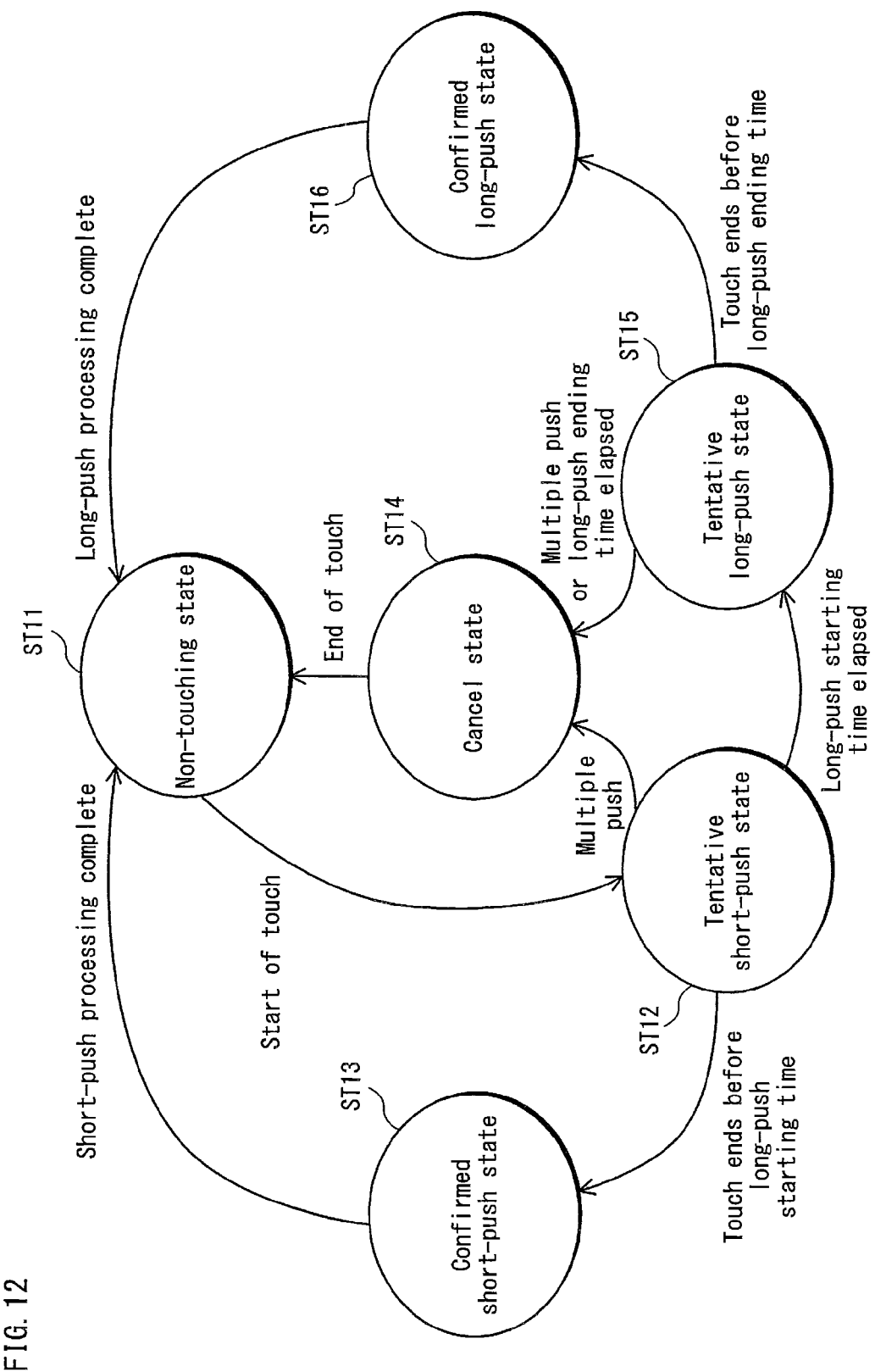
FIG. 12 is a state transition diagram illustrating changes in the input state of a touch pad 102 during a call by a modified mobile phone.

FIG. 12 is a state transition diagram illustrating changes in the input state of the touch pad 102 during a call by the modified mobile phone.

Note that "end of touch" in FIG. 12 indicates that a touch has been released, as in FIG. 3.

As shown in FIG. 12, the input states of the touch pad 102 during a call by the modified mobile phone are a non-touching state ST11, a tentative short-push state ST12, a confirmed short-push state ST13, a cancel state ST14, a tentative long-push state ST15, and a confirmed long-push state ST16.

Like the non-touching state ST1 in the mobile phone 100 of the embodiment, the non-touching state ST11 indicates a state in which the touch pad 102 has not been touched at all. When a touch of a button on the touch pad 102 begins, the input state transitions to the tentative short-push state ST12. Regardless of the type of button on which the touch begins, the input state transitions to the tentative short-push state ST12, unlike the mobile phone 100.

The tentative short-push state ST12 indicates that the touch of a button has begun. In this state, it cannot yet be determined whether the touch that has begun is due to user operation or is an erroneous operation. Furthermore, even when the touch is a user operation, a short push cannot be distinguished from a long push.

Upon a transition to this state, an event notification unit in the modified mobile phone notifies an application execution unit of a tentative short-push event. The application execution unit performs tentative short-push processing.

Depending on the elapsed time after the start of the touch of the button, and on whether a multiple push occurs, one of the following states is transitioned to from this state: the confirmed short-push state ST13, the cancel state ST14, or the tentative long-push state ST15.

The confirmed short-push state ST13 indicates that the touch of a button has been released in less than the long-push starting time and that the touch has been determined to be a press of a regular button, or a short push of a multifunction button, initiated by the user.

Upon a transition to this state, the event notification unit of the modified mobile phone notifies the application execution unit of a cancel event and a confirmed short-push event, in this order. The application execution unit then performs cancel processing and short-push processing, in this order. When the short-push processing is complete, the input state transitions to the non-touching state ST11.

The cancel state ST14 indicates that either the long-push ending time has elapsed after the beginning of the touch of the button without the touch being released, or that a multiple push has occurred. In this state, it is determined that the touch is an erroneous operation.

Upon a transition to this state, the event notification unit in the modified mobile phone notifies the application execution unit of a cancel event. The application execution unit performs cancel processing. From this state, the non-touching state ST11 is transitioned to upon release of the touch.

The tentative long-push state ST15 indicates that the long-push starting time has elapsed after the beginning of the touch of the button without the touch being released. In this state, it is determined that, at the very least, the touch that has started is neither a user-initiated press of a regular button nor a user-initiated short push of a multifunction button. In other words, in this state, it cannot yet be determined whether the touch is a long push by the user or an erroneous operation.

Upon a transition to this state, the event notification unit of the modified mobile phone notifies the application execution unit of a cancel event and a tentative long-push event, in this order. The application execution unit then performs cancel processing and tentative long-push processing, in this order.

The tentative long-push event is an event indicating that the input state has transitioned to the tentative long-push state ST15 and includes button information on the button that is being touched. The tentative long-push processing is, for example, processing to instruct the display control unit 115 to perform, on the display 101, display processing included in long-push processing for the button indicated by the button information included in the tentative long-push event.

Depending on the elapsed time after the start of the touch of the button, and on whether a multiple push occurs, either the cancel state ST14 or the confirmed long-push state ST16 is transitioned to from this state. In particular, the tentative long-push state ST15 transitions to the cancel state ST14 when a multiple push occurs, or when the long-push ending time has elapsed after the beginning of the touch of the button.

The confirmed long-push state ST16 indicates that after the start of the touch of the button, the touch has been released after the long-push starting time has elapsed and before the long-push ending time has elapsed. In this state, it is determined that the touch is a long push of the button by the user.

Upon a transition to this state, the event notification unit of the modified mobile phone notifies the application execution unit of a cancel event and a confirmed long-push event, in this order. The application execution unit then performs cancel processing and long-push processing, in this order. When the long-push processing is complete, the input state transitions to the non-touching state ST11. If the button that was touched is a regular button, short-push processing is performed. When the short-push processing is complete, the input state transitions to the non-touching state ST11.

(5) In the embodiment, when the input state of the touch pad 102 transitions to the tentative short-push state ST2, the mobile phone 100 has been described as performing tentative short-push processing by updating the display of the display 101. Along with updating the display, it is possible also to perform processing other than processing that would have a relatively large effect if it turns out that the input from the touch pad 102 is an erroneous operation. For example, the following processing may be performed: (A) storing the number of the button touched by the user in a buffer in preparation for dialing, (B) displacement of the cursor, or (C) photography using an internal camera. In (A), an example of cancel processing for tentative short-push processing would be to discard the number stored in the buffer. In (B), an example of cancel processing for tentative short-push processing would be to return the displaced cursor to its original position. In (C), an example of cancel processing for tentative push processing would be to delete the photographed image, and an example of short-push processing would be to output a shutter sound from the speaker 106.

The above-mentioned processing that would have a relatively large effect includes, for example, communications processing other than a call currently in progress, processing to output audio from the speaker 106, and processing for the vibrator 108 to emit noise. During a call, communications processing such as transmission of a DTMF tone or automatic dialing via a three-way call function would have a large effect by causing a serious malfunction, such as an unintended banking transaction or phone charges. Audio output processing, such as output of a DTMF tone from the speaker 106, and processing for the vibrator 108 to emit noise have a relatively large effect, as they would obstruct the call by the user of the mobile phone according to the present invention.

In other words, the above-mentioned processing that would have a relatively large effect should be performed upon determination that an operation is not erroneous (that is, when transitioning to the confirmed short-push state ST3 or the confirmed long-push state ST6). In sum, short-push processing and long-push processing are not limited to the examples described in the embodiment and may include, for example, the above-described communications processing, processing to output audio from the speaker 106, and processing for the vibrator 108 to emit noise.

(6) In the embodiment, the state determining unit 112 was described as determining that a multiple push occurs when the number of buttons being touched is eight or more, but this is only an example. The determination of a multiple push may be made when any predetermined number, two or greater, of buttons are touched. For example, it can be considered that the number of buttons pressed by the user's ear, cheek, or the like touching the touch pad 102 during a call will vary slightly by user. Accordingly, upon the start of use of the mobile phone 100, for example, it is possible to have a user actually place the speaker 106 of the mobile phone 100 by either ear, and then to count the number of buttons being touched, subsequently determining that a multiple push occurs when at least that number of buttons is touched. The user may also be allowed to set a predetermined number for determination of a multiple push.

(7) All or a portion of the constituent elements described in the embodiment may be implemented as an integrated circuit with one chip or a plurality of chips, implemented as a computer program, or embodied in another form.

(8) Programs that cause a Central Processing Unit (CPU) to execute the processing corresponding to input from the touch pad 102 as described in the embodiment (see, for example, FIGS. 4 to 6) may be circulated and distributed across a variety of transmission channels or by being recorded on a recording medium. Such recording media include IC cards, optical discs, flexible disks, ROM, flash memory, and the like. The circulated and distributed programs are used by being stored in a memory readable by a CPU within a device. The CPU then executes the programs in order for the mobile phone 100 in the embodiment to achieve its functions.

The touch pad 102 of the embodiment, as well as the touch panel of the modification, have been described as employing a capacitance-based touch sensor. As needed, the type of capacitance-based touch sensor used may be a projection type, a surface type, or the like. In a projection-type capacitance touch sensor, a number of electrode patterns are formed on a substrate made of plastic, glass, or the like, and a touched location is determined by measuring the ratio of current on a plurality of electrode patterns near the touched point. A surface-type capacitance touch sensor includes a conductive film and a substrate. Electrodes are provided at corners of the substrate, and the conductive film forms a uniform electric field. A touched location is determined by measuring the ratio of current on the corner electrodes due to a touch by a finger or the like.

In the above embodiment, the touch pad 102 is implemented by a touch sensor based on capacitance, but the present invention is not limited in this way. The touch pad 102 may be an electromagnetic induction type that uses a dedicated pen such as an electronic pen, a matrix switching type formed by two-tiered transparent electrodes, a resistance type that applies voltage to one of two resistance films and detects the voltage at the position of an operation on the other resistance film, a surface acoustic wave type that detects contact by a finger or the like by detecting the rebound of an oscillating wave through a change in voltage of a piezoelectric element, an infrared type that detects the position of contact by a finger or the like through a blocked infrared ray, or a light sensor type that incorporates a light sensor in the screen to detect a touched location.

(9) The following further describes the structure of, modifications to, and advantageous effects achieved by a mobile communication terminal according to an embodiment the present invention.

(a) A mobile communication terminal according to an embodiment of the present invention executes processing in response to input from a touch pad and comprises: a display unit; a first execution unit configured to execute first partial processing, among corresponding processing that corresponds to a position of a touch, upon a start of the touch on the touch pad, the first partial processing including updating of a display state of the display unit; a first determination unit configured to determine whether, between the start of the touch on the touch pad and a release of the touch, at least a predetermined number of positions are touched, or whether a first time elapses after the start of the touch on the touch pad without the touch being released; and a second execution unit configured to execute second partial processing, which is a remainder of the corresponding processing excluding the first partial processing, when the touch on the touch pad is released without the first determination unit determining affirmatively, and to set the display state of the display unit to a same state as before the updating when the first determination unit determines affirmatively.

With the mobile communication terminal according to the embodiment of the present invention with the above structure, when the user performs a normal operation with a finger or the like, then when the touch by the finger or the like begins, at least the display of the display unit will be updated. The user can therefore recognize that processing has begun, which avoids giving the user the impression of a reduced response.

If, for example, a user's ear or the like happens to touch the touch pad during a call, it can be assumed that multiple locations are touched, or that the touch will be maintained for a relatively long time. By setting the predetermined number and the first time appropriately, the first determination unit becomes highly likely to determine affirmatively in such a case. In this case, the second partial processing, which is the remainder of the corresponding processing excluding the first partial processing, is not performed, and the display of the display unit is set to the same state as before the updating. This adequately prevents a malfunction from occurring due to the user's ear or the like touching the touch pad.

(b) The mobile communication terminal may include a calling function and may further comprise: a call determination unit configured to determine whether a call is in progress; and a third execution unit configured to execute the corresponding processing upon the start of the touch on the touch pad when the call determination unit determines negatively, wherein when the call determination unit determines affirmatively, the first execution unit executes the first partial processing, and the second execution unit executes the second partial processing.

With this structure, the mobile communication terminal can rapidly execute the corresponding processing when a call is not in progress, i.e. when the probability of the user's ear or the like touching the touch pad is low, while adequately preventing a malfunction during a call based on the result of determination by the first determination unit.

(c) The mobile communication terminal may further comprise: a storage unit, wherein when updating the display state, the first execution unit stores state information in the storage unit to indicate the display state of the display unit before updating, and the second execution unit returns the display state of the display unit to the same state as before the updating in accordance with the state information stored in the storage unit.

With this structure, the mobile communication terminal stores the state information for before the updating of the display state of the display unit. Therefore, if the user's ear or the like touches the touch pad and the first determination unit determines affirmatively, the display state of the display unit that is updated can be returned to the same state as before the updating based on the stored state information.

(d) The first partial processing may includes only the updating, and after returning the display state of the display unit to the same state as before the updating, the second execution unit may execute the second partial processing by executing the corresponding processing.

With this structure, the mobile communication terminal performs the second partial processing by performing the corresponding processing after returning the display state of the display unit to the same state as before the updating. It is therefore not necessary to manage the content of the second partial processing. In other words, the second partial processing can be executed by simply managing the content of the first partial processing and the content of the corresponding processing, without a need for managing the status of execution of each partial processing constituting the corresponding processing.

(e) The first partial processing may be configured to include none of audio output, noise emission by a vibrator, and communication with an external device other than communication for a call in progress, and the second partial processing may include at least one of audio output, noise emission by a vibrator, and communication with an external device other than communication for a call in progress.

With this structure, when the user's ear or the like touches the touch pad and the first determination unit determines affirmatively, the mobile communication terminal does not perform audio output, noise emission by a vibrator, or processing for communication with an external device other than communication for the call currently in progress.

This adequately prevents a serious malfunction from occurring due to the user's ear or the like touching a button on the touch pad, such as communication charges being incurred, or an unwanted transaction being performed because of transmission of a DTMF tone during use of a service such as telephone banking with a financial institution.

This also adequately prevents processing that would obstruct a call in progress, such as output of a DTMF tone from the speaker or noise from the vibrator due to the user's ear or the like touching a button on the touch pad during a call.

(f) The mobile communication terminal may further comprise a second determination unit configured to determine whether a time elapsing from the start of the touch on the touch pad until the touch is released is shorter than the first time and is at least a second time, the second time being shorter than the first time, wherein the second partial processing differs depending on whether the second determination unit determines affirmatively.

With this structure, the mobile communication terminal executes different processing as the second partial processing depending on whether the time elapsing from the start of the touch on the touch pad until the touch is released is determined by the first determination unit to be shorter than the first time and at least as long as the second time, which is shorter than the first time. This allows for allocation of different processing when (i) the time from the start of the touch of a button until the touch is released is less than the second time and (ii) the time is at least the second time and less than the first time. In other words, processing may differ depending on whether the touch is a long push.

(g) The mobile communication terminal may further comprise a display device disposed to overlap the touch pad, wherein images related to the corresponding processing are displayed on the display device.

With this structure, the mobile communication terminal displays images related to the corresponding processing on the display device disposed to overlap the touch pad. Displaying icons as the images, for example, allows for intuitive usability.

(10) The display unit, touch pad, and storage unit of the mobile communication terminal according to the present invention correspond to the display 101, the touch pad 102, and the storage unit 105 of the mobile phone 100 according to the embodiment. The first execution unit, the second execution unit, and the third execution unit of the mobile communication terminal according to the present invention correspond to the state determining unit 112 and the event notification unit 113 in the control unit 110 and to the application execution unit 120 of the mobile phone 100 according to the embodiment. The first determination unit and the second determination unit of the mobile communication terminal according to the present invention correspond to the state determining unit 112 of the control unit 110 and to the timing unit 103 of the mobile phone 100 according to the embodiment. The call determination unit of the mobile communication terminal according to the present invention corresponds to the call detection unit 111 of the control unit 110 of the mobile phone 100 according to the embodiment.

[Industrial Applicability]

The mobile communication terminal according to the present invention is useful when a user performs operations using a touch pad.

REFERENCE SIGNS LIST 1 housing
100, 200 mobile phone
101 display
102 touch pad
103 timing unit
104 communications unit
105 storage unit
106 speaker
107 microphone
108 vibrator
110 control unit
111 call detection unit
112 state determining unit
113 event notification unit
114 audio processing unit
115 display control unit
120 application execution unit
201 touch panel

The invention claimed is:

1. A mobile communication terminal that executes processing in response to input from a touch pad, comprising:
a display unit;
a first execution unit configured to execute first partial processing, among corresponding processing that corresponds to a position of a touch, upon a start of the touch on the touch pad, the first partial processing including updating of a display state of the display unit;
a first determination unit configured to determine whether, between the start of the touch on the touch pad and a release of the touch, at least a predetermined number of positions are touched, or whether a first time elapses after the start of the touch on the touch pad without the touch being released; and
a second execution unit configured to execute second partial processing, which is a remainder of the corresponding processing excluding the first partial processing, when the touch on the touch pad is released without the first determination unit determining affirmatively, and to set the display state of the display unit to a same state as before the updating when the first determination unit determines affirmatively.

2. The mobile communication terminal of claim 1, including a calling function and further comprising:
a call determination unit configured to determine whether a call is in progress; and
a third execution unit configured to execute the corresponding processing upon the start of the touch on the touch pad when the call determination unit determines negatively, wherein
when the call determination unit determines affirmatively,
the first execution unit executes the first partial processing, and
the second execution unit executes the second partial processing.

3. The mobile communication terminal of claim 2, further comprising:
a storage unit, wherein
when updating the display state, the first execution unit stores state information in the storage unit to indicate the display state of the display unit before updating, and
the second execution unit returns the display state of the display unit to the same state as before the updating in accordance with the state information stored in the storage unit.

4. The mobile communication terminal of claim 3, wherein
the first partial processing includes only the updating, and
after returning the display state of the display unit to the same state as before the updating, the second execution unit executes the second partial processing by executing the corresponding processing.

5. The mobile communication terminal of claim 4, wherein
the first partial processing includes none of audio output, noise emission by a vibrator, and communication with an external device other than communication for a call in progress, and
the second partial processing includes at least one of audio output, noise emission by a vibrator, and communication with an external device other than communication for a call in progress.

6. The mobile communication terminal of claim 1, further comprising
a second determination unit configured to determine whether a time elapsing from the start of the touch on the touch pad until the touch is released is shorter than the first time and is at least a second time, the second time being shorter than the first time, wherein
the second partial processing differs depending on whether the second determination unit determines affirmatively.

7. The mobile communication terminal of claim 1, further comprising
a display device disposed to overlap the touch pad, wherein images related to the corresponding processing are displayed on the display device.

8. An input control program used in a mobile communication terminal that executes processing in response to input from a touch pad,
the mobile communication terminal comprising a display unit, and
the input control program comprising:
a first execution step of executing first partial processing, among corresponding processing that corresponds to a position of the touch, upon a start of a touch on the touch pad, the first partial processing including updating of a display state of the display unit;
a first determination step of determining whether, between the start of the touch on the touch pad and a release of the touch, at least a predetermined number of positions are touched, or whether a first time elapses after the start of the touch on the touch pad without the touch being released; and
a second execution step of executing second partial processing, which is a remainder of the corresponding processing excluding the first partial processing, when the touch on the touch pad is released without an affirmative determination in the first determination step, and to set the display state of the display unit to a same state as before the updating when an affirmative determination is made in the first determination step.

* * * * *